US009652643B1

(12) United States Patent
Pesavento et al.

(10) Patent No.: US 9,652,643 B1
(45) Date of Patent: May 16, 2017

(54) POWERING RFID TAGS USING MULTIPLE SYNTHESIZED-BEAM RFID READERS

(71) Applicant: Impinj, Inc., Seattle, WA (US)

(72) Inventors: Alberto Pesavento, Seattle, WA (US); Christopher J. Diorio, Shoreline, WA (US)

(73) Assignee: IMPINJ, INC, Seattle, WA (US)

( * ) Notice: Subject to any disclaimer, the term of this patent is extended or adjusted under 35 U.S.C. 154(b) by 0 days.

(21) Appl. No.: 15/075,214

(22) Filed: Mar. 21, 2016

Related U.S. Application Data

(63) Continuation of application No. 14/388,793, filed as application No. PCT/US2014/026319 on Mar. 13, 2014, now Pat. No. 9,373,012.

(60) Provisional application No. 61/784,035, filed on Mar. 14, 2013, provisional application No. 61/887,238, filed on Oct. 4, 2013.

(51) Int. Cl.
*G06K 7/10* (2006.01)
*G06Q 10/08* (2012.01)

(52) U.S. Cl.
CPC ..... *G06K 7/10158* (2013.01); *G06K 7/10178* (2013.01); *G06K 7/10297* (2013.01); *G06Q 10/087* (2013.01)

(58) Field of Classification Search
CPC .................................................. G06K 7/10178
USPC ........................................ 235/385, 439, 451
See application file for complete search history.

(56) References Cited

U.S. PATENT DOCUMENTS

| | | |
|---|---|---|
| 9,178,277 B1 | 11/2015 | Moretti et al. |
| 2005/0212676 A1 | 9/2005 | Steinberg |
| 2006/0022800 A1 | 2/2006 | Krishna et al. |
| 2009/0309704 A1 | 12/2009 | Chang et al. |
| 2010/0219953 A1 | 9/2010 | Bloy |
| 2011/0025474 A1 | 2/2011 | Gangl |
| 2011/0090059 A1 | 4/2011 | Sadr |
| 2011/0187600 A1 | 8/2011 | Landt |

FOREIGN PATENT DOCUMENTS

WO            03061366 A2      7/2003

OTHER PUBLICATIONS

International Search Report and Written Opinion for PCT/2014/026319 filed on Mar. 13,2014, mailed on Jul. 30, 2014.

*Primary Examiner* — Toan Ly
(74) *Attorney, Agent, or Firm* — Turk IP Law, LLC

(57) ABSTRACT

Synthesized-beam RFID readers may be used to manage and provide information about RFID tag populations. In one embodiment, two or more synthesized-beam readers synthesize respective RF beams towards a tag location. The synthesized-beam readers may coordinate their pointing by means of a controller, a peer-to-peer network, or by using a master-slave arrangement. The synthesized-beam readers may coordinate their transmissions to increase the RF energy available to a tag at the pointing location.

21 Claims, 27 Drawing Sheets

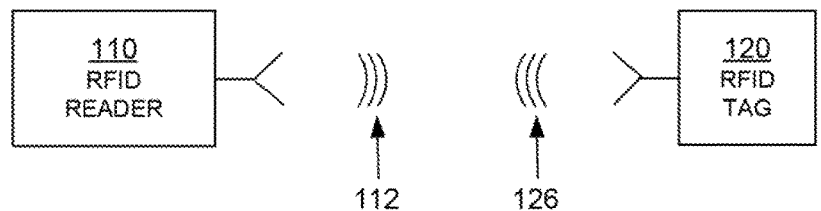
FIG. 1
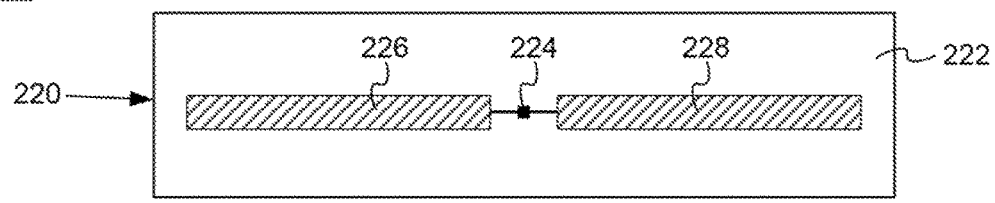
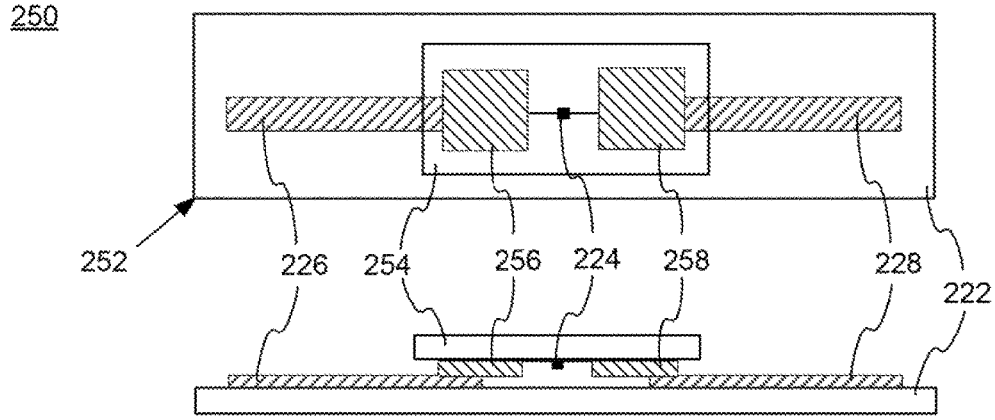
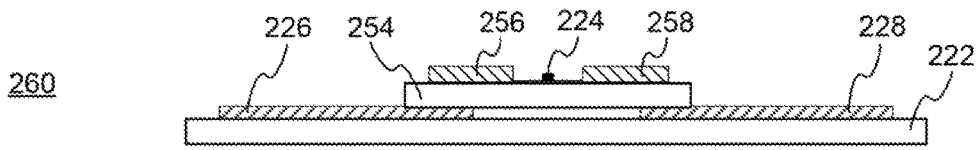
FIG. 2

SIGNAL PATH DURING R→T

SIGNAL PATH DURING T→R

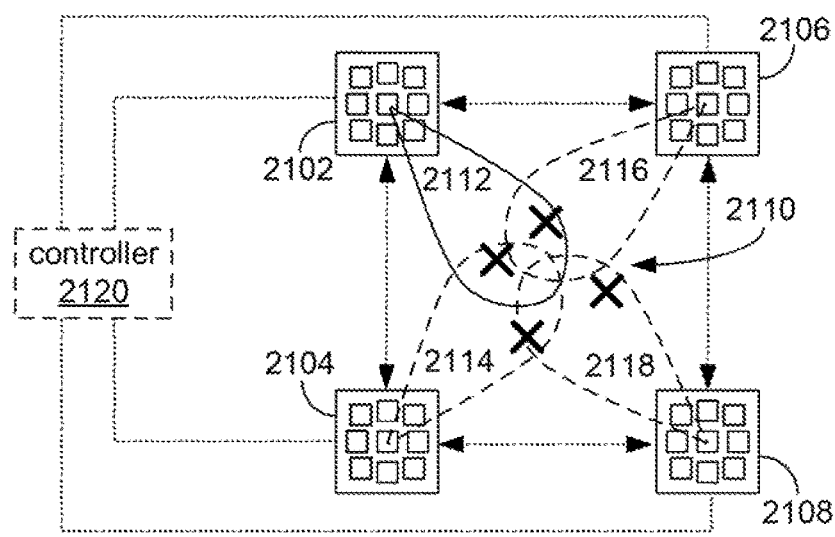
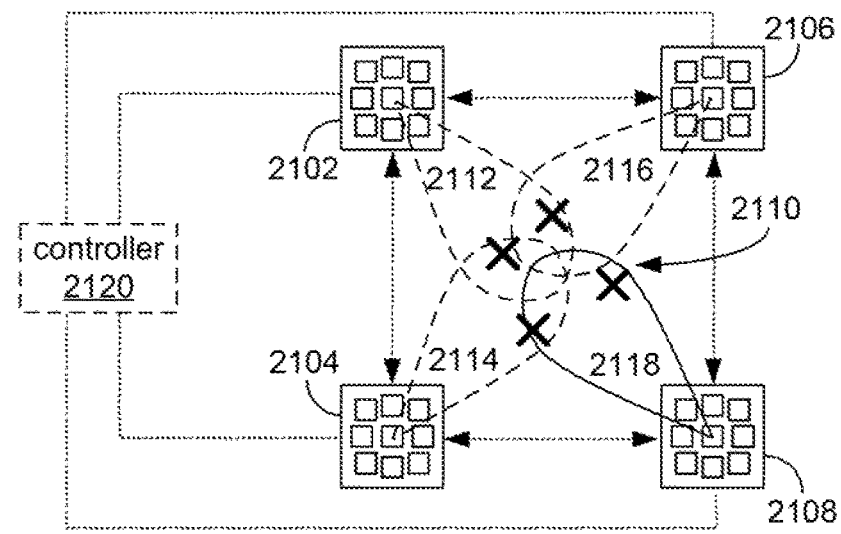
FIG. 21

POWERING RFID TAGS USING MULTIPLE SYNTHESIZED-BEAM RFID READERS

CROSS REFERENCE TO RELATED APPLICATIONS

This application is a continuation under 35 U.S.C. §120 of a co-pending U.S. patent application Ser. No. 14/388,793 filed on Sep. 26, 2014, which is a national phase application of International Application no. PCT/US14/26319 filed on Mar. 13, 2014 which claims priority to U.S. Provisional Patent Application Ser. No. 61/784,035 filed on Mar. 14, 2013 and 61/887,238 filed on Oct. 4, 2013. The disclosures of these provisional patent applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle. RFID techniques entail using an RFID reader to inventory one or more RFID tags, where inventorying involves at least singulating a tag and receiving an identifier from the singulated tag (where "singulated" is defined as an individual tag singled-out by a reader, potentially from among multiple tags, and an "identifier" is defined as any number identifying the tag or the item to which the tag is attached, such as a tag identifier (TID), an electronic product code (EPC), etc.). The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions. In typical RFID systems, an RFID reader transmits a modulated RF inventory signal (a command), receives a tag reply, and transmits an RF acknowledgement signal responsive to the tag reply.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to powering RFID tags using multiple synthesized-beam RFID readers. A synthesized-beam RFID reader, which comprises at least one RFID reader and an antenna array, electrically synthesizes multiple beam patterns by adjusting the signals provided to the antenna elements of the array. The multiple beam patterns may point in different physical directions, may provide different beam shapes, may provide different physical coverage, or a may provide mix of these attributes. The reader may comprise single or multiple transmitters, single or multiple receivers, be separate from and connected to elements of the antenna array, or be distributed and embedded within the elements of the array. Either the reader or an array controller may adjust the phase and/or amplitude of the signals provided to the array elements to synthesize the multiple beams. The antenna array may comprise multiple discrete antenna elements or may employ a continuous structure that can emulate multiple antennas. By switching among the beams, a synthesized-beam reader may scan its environment, essentially steering its gaze in different directions and with potentially different beam shapes as it scans. As a simple but not-limiting example of a synthesized-beam system, consider the antenna array on a U.S. Navy ship that forms a synthesized-beam radar, and envision the radar scanning the environment to inventory RFID tags rather than scanning the environment to detect distant ships or airplanes. Like a synthesized-beam radar, a synthesized-beam RFID reader may use multiple RF frequencies, different beam shapes, different beam directions, and different signal waveshapes to inventory/locate/track its target tags.

Embodiments are directed to interrogating (defined as inventorying and/or accessing) an RFID tag using multiple synthesized-beam RFID readers. A first synthesized-beam reader synthesizes a first beam to inventory a tag at a certain physical location. A second synthesized-beam reader simultaneously synthesizes a second beam towards the same physical location to "boost" or otherwise improve the likelihood or the performance of the interrogation. Unlike radar systems interrogating remote objects, RFID tags extract power from the interrogating wave and modulate their antenna reflectance to generate a backscattered signal. Even more unlike radar systems, some RFID tags are able to extract power from a wave transmitted by one reader even as they are responding to an interrogating signal in the wave transmitted by another. In these embodiments, the first reader will transmit commands to, and receive responses from, the tag, while the second will transmit an unmodulated or minimally modulated wave to the tag to boost the tag's extracted power and thereby extend its interrogation range.

Of course, those skilled in the art will recognize many possible variants on the above-described two-reader scenario. As one example, the first reader may transmit commands, the second reader may transmit power, and the second reader (rather than the first) may receive the tag's responses. As another example, the first reader may transmit commands to, and receive responses from, the tag, while second and third (or perhaps even more) RFID readers deliver power to the tag. As yet another example, both first and second RFID readers may transmit the same command to the tag, thereby delivering both a stronger command signal and more power to the tag.

Embodiments are directed to methods of directing at least two synthesized-beam RFID readers to point to a common physical location to inventory an RFID tag. Such methods may include one synthesized-beam reader acting as a master and directing other readers to point to the location, peer-to-peer communications among synthesized-beam RFID readers to indicate the location, or a controller directing the synthesized-beam RFID readers to point to the location. The directing may include choosing the physical location, the beam shape, the duration of the interrogation, the transmit frequencies of the various synthesized-beam RFID readers, which reader(s) is/are sending commands and which are sending RF power, the commands to be transmitted, command parameters (such as datarate, modulation format, reply frequency, and other communication parameters as will be well known to those skilled in the art), which readers are receiving the tag response, the polarization of the transmit and receive beams, the transmit power, and the receive sensitivity.

Embodiments are also directed to techniques for tracking an RFID tag using synthesized-beam RFID readers, including using flag refresh commands to segment RFID tag subpopulations and thereby evaluate or predict tag movement within a background of stationary tags.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 21 depicts how multiple synthesized-beam readers can cooperate to communicate with a population of tags according to embodiments.

DETAILED DESCRIPTION

Figure 3:
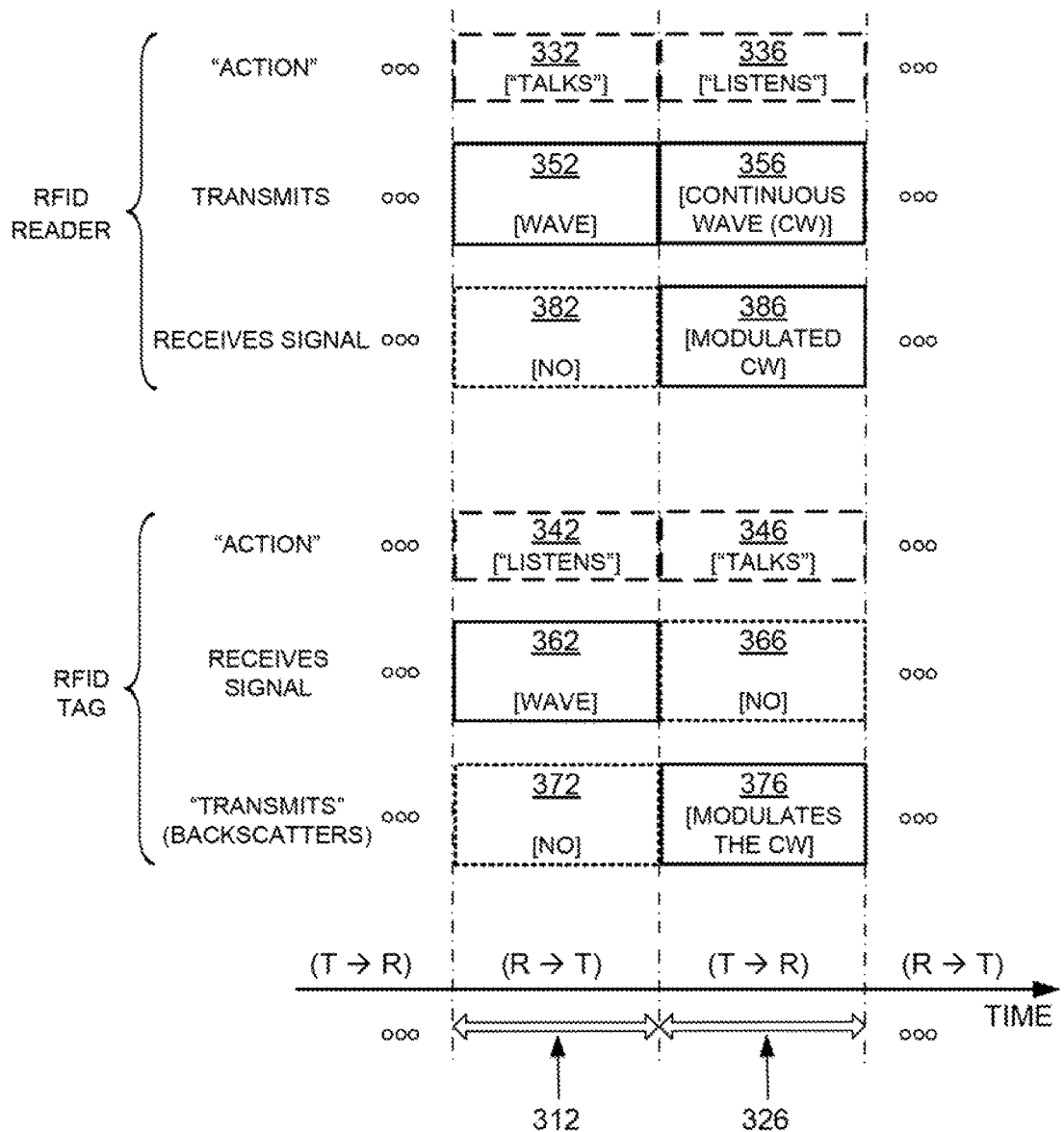
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more instructions. "Instruction" refers to a request to a tag to perform an action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126, which are amplitude- and/or phase-modulated waves. When communicating, each encodes, modulates, and transmits data to the other, and each receives, demodulates, and decodes data from the other. The data can be modulated onto, and demodulated from, RF waves, such as for signals 112 and 126. The RF waves are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein means that a low-impedance path exists between the electrically coupled components, and may mean the presence of a direct electrical connection or a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which is a modulated RF signal as described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier RF signal that is typically not amplitude modulated or phase modulated and therefore encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
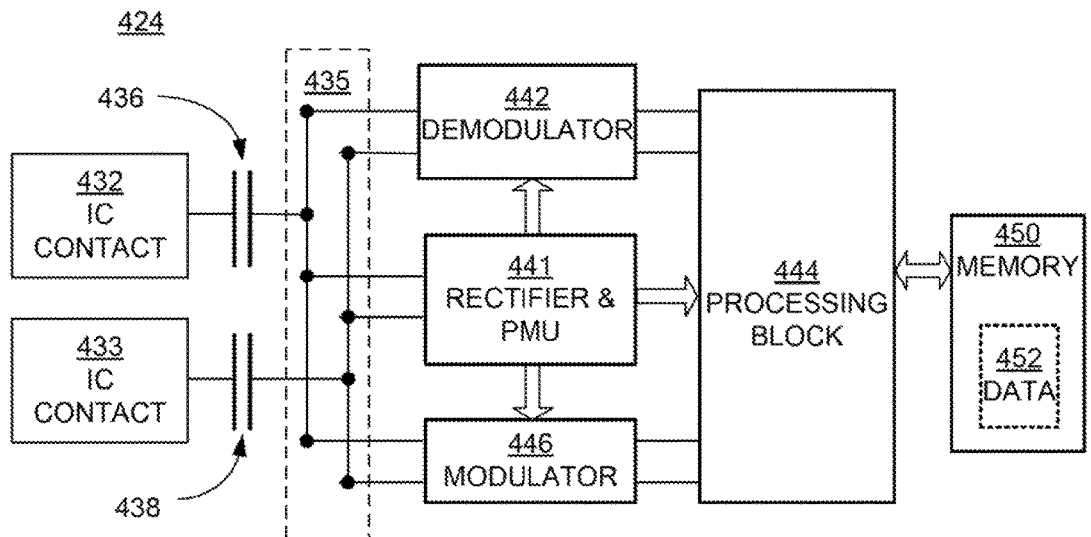
FIG. 4 is a block diagram showing a detail of an RFID IC.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432 and 433 suitable for coupling to antenna segments such as segments 226/228 of RFID tag 220 of FIG. 2. When two IC contacts form the signal input from and signal return to an antenna they are often referred-to as an antenna port. IC contacts 432 and 433 may be made in any suitable way, such as with metallic pads and so on. In some embodiments circuit 424 uses more than two contacts, especially when tag 220 has more than one antenna port and/or more than one antenna.

Circuit 424 includes signal-routing section 435 which may include signal wiring, signal-routing busses, receive/transmit switches that can selectively route a signal, and so on. In some embodiments, circuit 424 includes optional capacitors 436 and/or 438. If present, capacitors 436/438 capacitively couple IC contacts 432/433 to signal-routing section 435, which in turn electrically couples to other components of circuit 424 described below. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or at least partly external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by the antenna to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
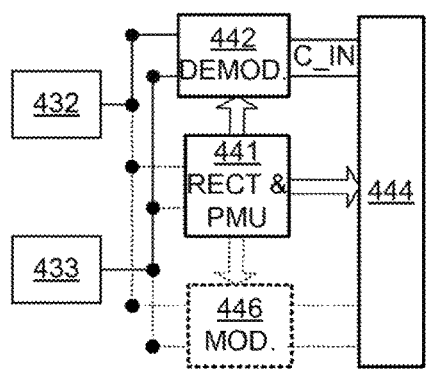
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
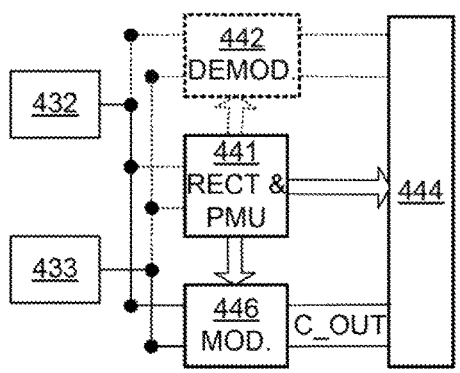

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol. A protocol is a specification or industry standard such as the Gen2 Specification described above that calls for specific manners of signaling between the reader and the tags. A protocol specifies, in part, symbol encodings, and may include a set of modulations, rates, timings, or any other parameter associated with data communications.

In addition, a protocol can be a variant of a stated specification such as the Gen2 Specification, for example including fewer or additional commands than the stated specification calls for, and so on. In such instances, additional commands are sometimes called custom commands. In embodiments where circuit 424 includes multiple demodulators and/or modulators, each may be configured to support different protocols or different sets of protocols.

Figure 6:
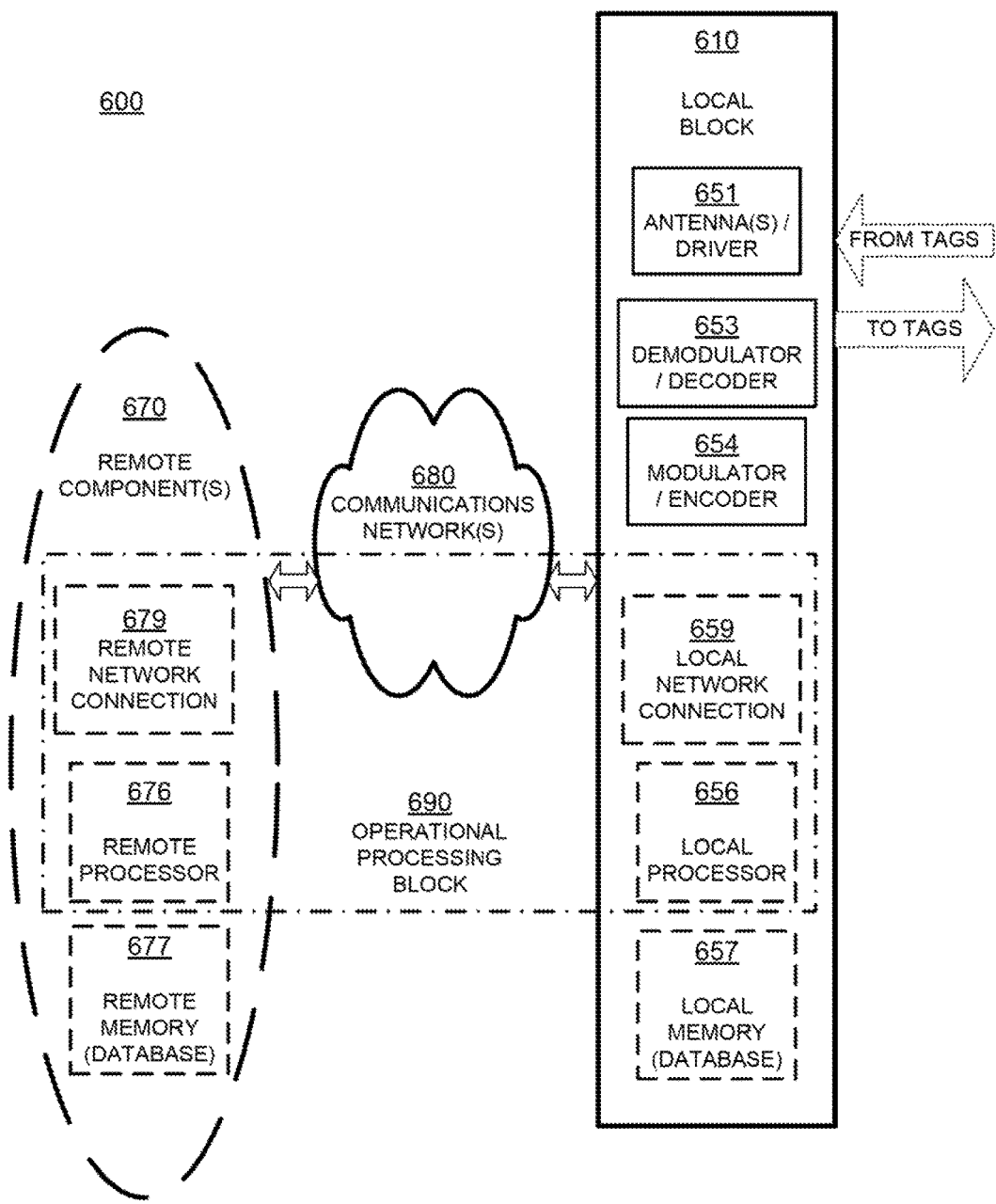
FIG. 6 is a block diagram of a whole RFID reader system according to embodiments.

FIG. 6 is a block diagram of a whole RFID reader system 600 according to embodiments. System 600 includes a local block 610, and optionally remote components 670. Local block 610 and remote components 670 can be implemented in any number of ways. It will be recognized that reader 110 of FIG. 1 is the same as local block 610, if remote components 670 are not provided. Alternately, reader 110 can be implemented instead by system 600, of which only the local block 610 is shown in FIG. 1.

Local block 610 is responsible for communicating with tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 653 demodulates and decodes backscattered waves received from the tags via antenna block 651. Modulator/encoder block 654 encodes and modulates RF waves that are to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 653, the encoding function in block 654, or both, may be performed instead by local processor 656. In some cases local processor 656 may implement an encryption or authorization function; in some cases one or more of these functions can be distributed among other blocks such as encoding block 654, or may be entirely incorporated in another block.

Local block 610 additionally includes an optional local memory 657. Local memory 457 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs), keys, hashes, and other data. Local memory 657 can also include reference data that is to be compared to the EPC, instructions and/or rules for how to encode commands for the tags, modes for controlling antenna 651, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a whole reader may be characterized as "analog" or "digital", but most readers contain a mix of analog and digital functionality.

If remote components 670 are indeed provided, they are coupled to local block 610 via an electronic communications network 680. Network 680 can be a Local Area Network (LAN), a Metropolitan Area Network (MAN), a Wide Area Network (WAN), a network of networks such as the internet, or a mere local communication link, such as a USB, PCI, and so on. Local block 610 may include a local network connection 659 for communicating with network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656.

Remote component(s) 670 can also include a remote memory 677. Remote memory 677 can be made in any way known in the art, such as was described with reference to local memory 657. Remote memory 677 may include a local database, and a different database of a Standards Organization, such as one that can reference EPCs. Remote memory 677 may also contain information associated with commands, tag profiles, keys, or the like, similar to local memory 657

Of the above-described elements, it is advantageous to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 659 with local network connection 679. The portion can be dynamically changeable, etc. In addition, operational processing block 690 can receive and decode RF waves received via antenna driver 651, and cause antenna driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location agnostic, in that its functions can be implemented either by local processor 656, by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna driver block 651, with modulator/encoder block 654 encoding and modulating the information on an RF wave. Then data is received from the tags via antenna driver block 651, demodulated and decoded by demodulator/decoder block 653, and processed by operational processing block 690.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
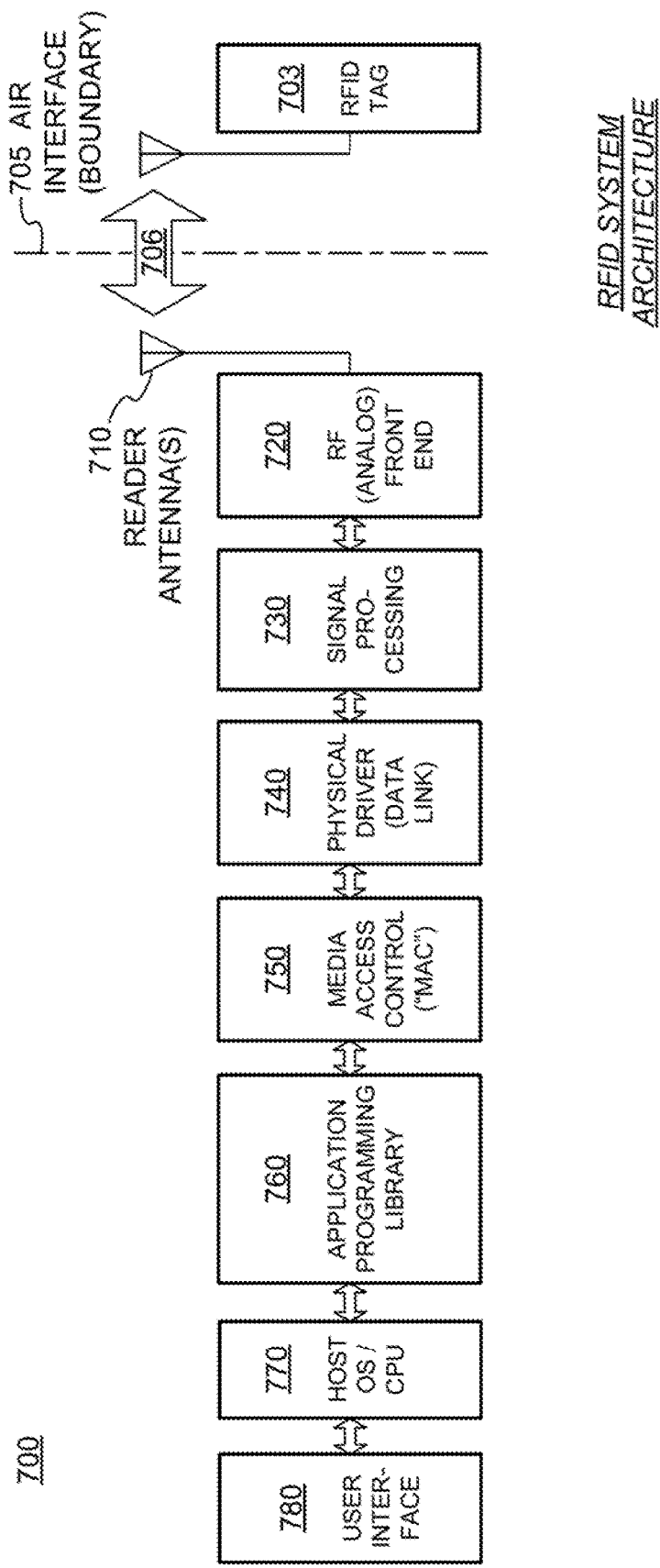
FIG. 7 is a block diagram illustrating an overall architecture of an RFID system according to embodiments.

FIG. 7 is a block diagram illustrating an architecture of an RFID system 700 according to embodiments. For reasons of clarity, RFID system 700 is subdivided into modules or components. Each of these modules may be implemented by itself, or in combination with others. In addition, some of them may be present more than once. Other embodiments may be equivalently subdivided into different modules. It will be recognized that some aspects of FIG. 7 are parallel with those described previously.

RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that interface as a boundary.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750, which is also known as MAC layer module. In one embodiment, MAC layer module 750 exchanges packets of bits with physical driver module 740. MAC layer module 750 can make decisions for sharing the medium of wireless communication, which in this case is the air interface but in other embodiments could be a wired interface.

RFID system 700 moreover includes an application-programming library-module 760, which can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

Everything described above in terms of readers and reader components finds some correspondence with tags and tag ICs, and vice versa. Numerous details have been set forth in this description, which is to be taken as a whole, to provide a more thorough understanding of the invention. In other instances, well-known features have not been described in detail, so as to not obscure unnecessarily the invention.

Figure 8:
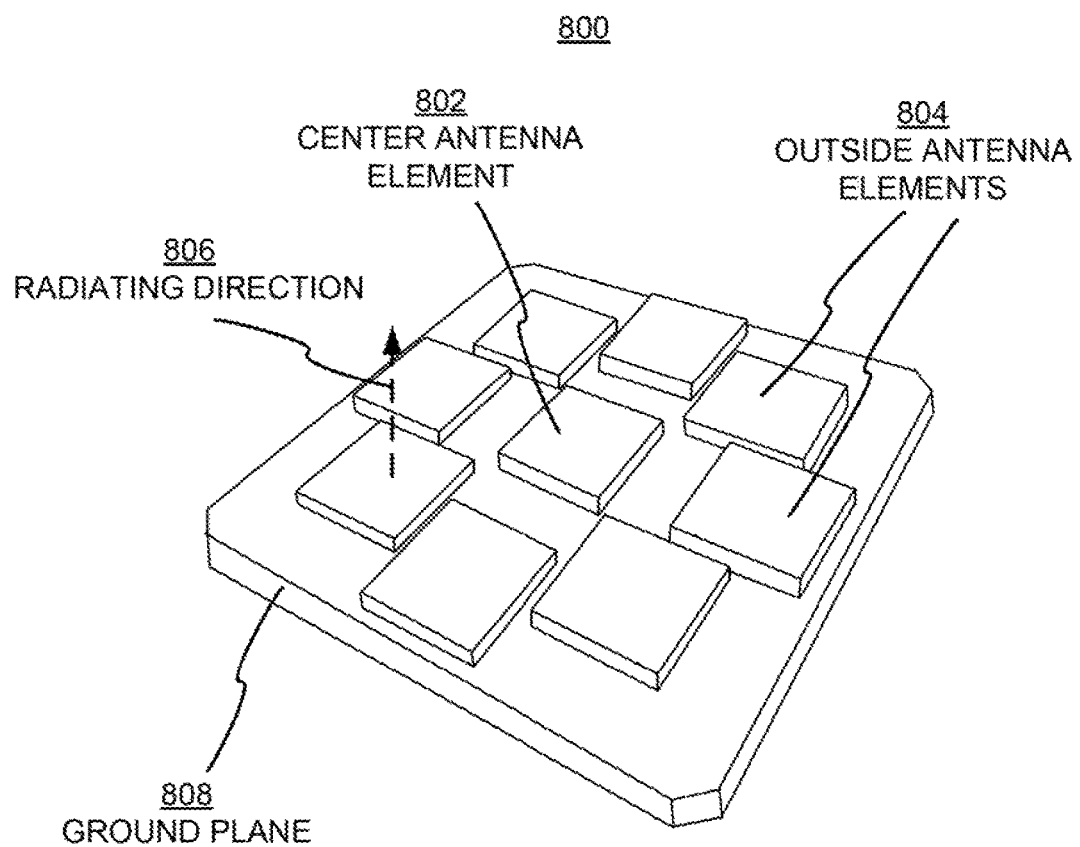
FIG. 8 depicts a discrete-element antenna array according to embodiments.

One or more RFID readers, or distributed portions of one or more readers, may be coupled to or embedded within an antenna array to form a synthesized-beam reader (SBR) capable of generating multiple RF beams, as described above. FIG. 8 depicts a perspective view of an antenna array 800 with discrete radiating elements according to embodiments. Antenna array 800 includes an array of antenna elements 802 and 804, and a ground plane 808 behind elements 802 and 804. Each element has a radiating direction vector 806 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 802 and 804. The direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the signal to be transmitted and then direct the generated signal to elements 802 and 804 with different amplitudes and phases. Alternatively, the SBR may synthesize the different signals for each antenna element digitally and then convert the digital signals to analog. In other embodiments the SBR may use a mix of these approaches. Similarly, during a receive operation the SBR may combine analog signals after appropriate phase shifting and amplitude adjustment of each, or it may digitize the signals from each element and combine them digitally, or a mix thereof.

The antenna elements of SBA 800 may be one or more of patch, slot, wire, horn, helical, distributed, or any other type as will be known to those skilled in the art. Whereas FIG. 8 only shows nine antenna elements, antenna arrays with any number of antenna elements may be used, including a single distributed element or an element made from metamaterials. In some embodiments ground plane 808 may be nonplanar (e.g., curved, concave, convex, etc.) and in other embodiments need not exist.

Figure 9A:
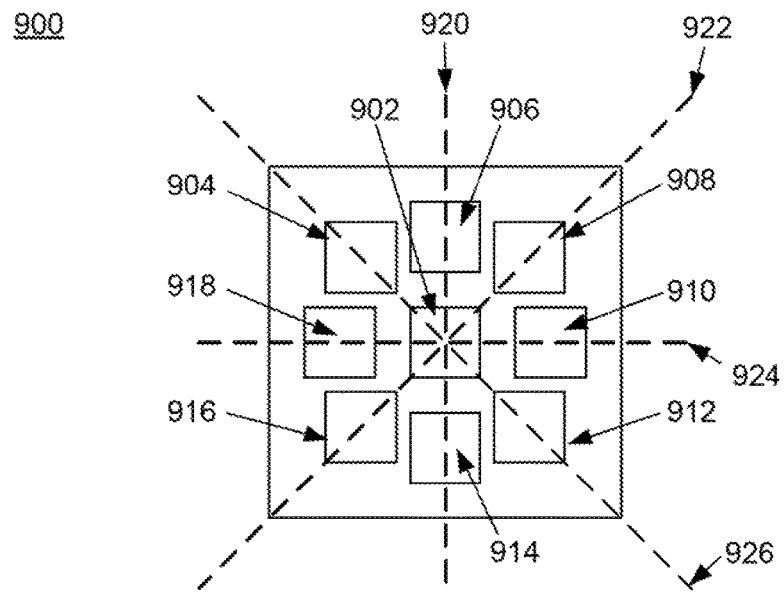
FIGS. 9A and 9B depict the antenna array of FIG. 8 synthesizing a beam in different physical directions, according to embodiments.
Figure 9B:
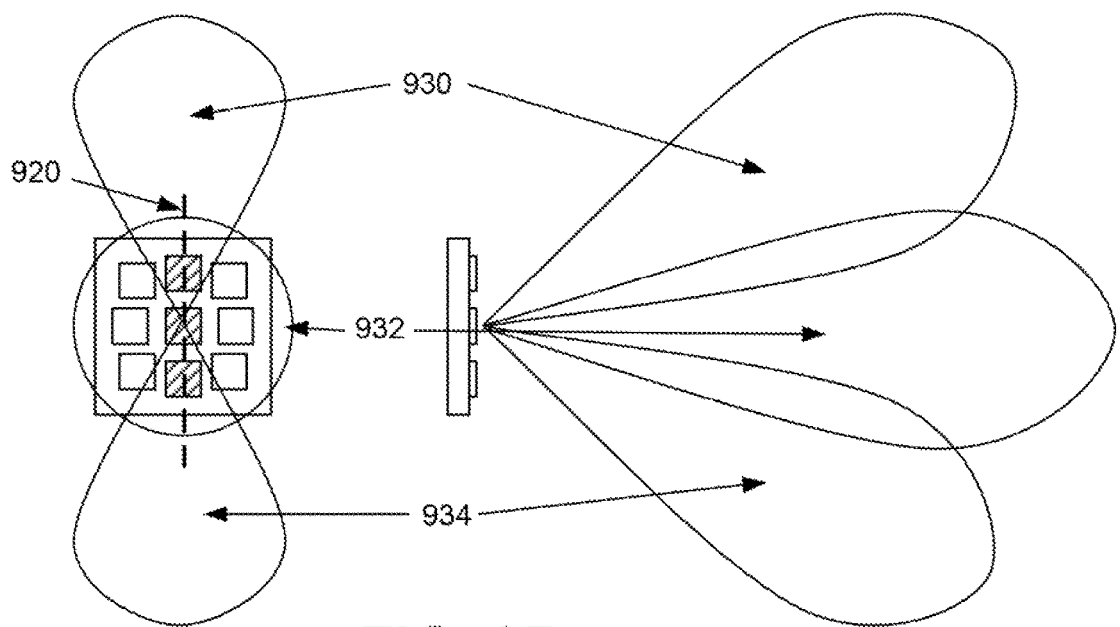

FIGS. 9A and 9B show the directions of some of the RF beams that SBA 900, similar to SBA 800 in FIG. 8, can generate. SBA 900 has nine antenna elements 902-918, with element 902 at the center and elements 904-918 around it. The shape and direction of the beam that SBA 900 generates depends on the signals to/from each element. Suppose that SBR 900 transmits using primarily elements 902, 906, and 914. Then, depending on the amplitude and phase of the signals applied to these elements, SBA 900 can steer a beam along the direction indicated by dashed line 920. In a similar fashion, suppose that SBR 900 transmits primarily using elements 902, 908, and 916. Then, depending on the amplitude and phase of the signals applied to these elements, SBA 900 can steer a beam along the direction indicated by dashed line 922. Of course, other steering arrangements are possible, including using all 9 elements to transmit and/or receive in arbitrary directions and to generate narrow beams.

FIG. 9B shows how RF beams with different directions can be synthesized using antenna elements located along line 920, with the diagram to the left depicting a head-on view similar to FIG. 9A and the diagram to the right depicting a side view. As described above, the beam direction can be controlled by varying the amplitude and phase of the signals to/from the antenna elements. For example, by applying a leading signal phase to element 906, an intermediate signal phase to element 902, and a trailing signal phase to element 914, the SBA will tend to steer its beam downward as in beam 934. Switching leading and lagging from elements 906/902 to elements 902/906 will tend to steer the beam upwards as in beam 930. Of course, the actual beam shape depends on both the magnitude of the phase shifting and the magnitude of the amplitude scaling (if any).

Figure 10:
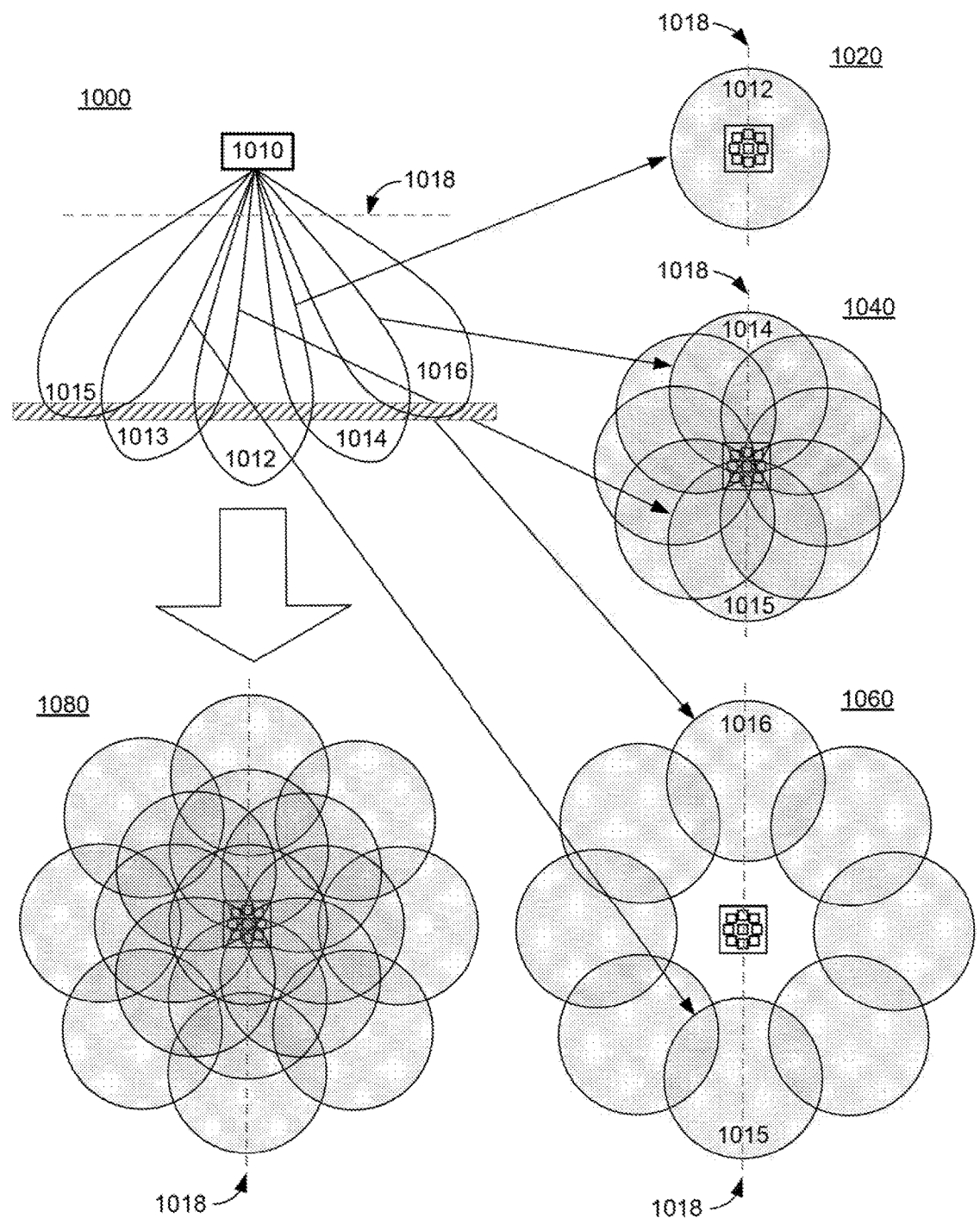
FIG. 10 depicts some of the potential beam locations that can be synthesized by the antenna array of FIG. 8, according to embodiments.

FIG. 10 depicts potential beams from an SBR according to embodiments. Diagram 1000 depicts a side perspective of SBR 1010, capable of synthesizing at least five different RF beams 1012, 1013, 1014, 1015, and 1016, arranged along line 1018 (similar to line 920 in FIG. 9A), with each RF beam pointed in a different direction.

Diagrams 1020, 1040, 1060, and 1080 depict coverage areas, shown as shaded circles, of the beam patterns generated by SBR 1010. A beam generated by an SBR has a coverage volume, also known as the beam's "field-of-view (FoV)", which is a volume in three-dimensional space where, during transmission, the transmitted energy density exceeds a threshold, and where, during receiving, the received energy density exceeds a threshold. A beam's coverage area is a projection of the beam's FoV on a surface. The FoV and coverage area may be different during transmit and receive, and may vary with reader or tag power, the thresholds, the distance between the SBR and the surface, and other parameters.

Diagram 1020 depicts the coverage area of central beam 1012. Diagram 1040 depicts the coverage areas of the inner beams such as 1014 and 1015. Diagram 1060 depicts the coverage areas of the outer beams such as 1015 and 1016. Finally, diagram 1080 depicts the total coverage area of all the beams formed by SBR 1010. As shown in diagrams 1020-1080, beam coverage areas may overlap. For example, inner beam 1014 may overlap with the central beam 1012, with one or more other inner beams, and with one or more other outer beams.

Whereas SBR 1010 is depicted as being able to generate and switch between five beams on an axis (e.g., axis 1018), in other embodiments an SBR may generate and switch between more or fewer beams on any given axis. Similarly, whereas SBR 1010 is depicted as being able to generate beams on four different axes (e.g., axes 920, 922, 924, and 926 in FIG. 9A), in other embodiments an SBR may be configured to generate beams on more or fewer axes. An individual beam's coverage area in FIG. 10 and subsequent figures is depicted as circular for simplicity, and in actuality may be of any suitable shape, and may vary based on interactions between the different elements that form the beam, as well as the orientation and topology of the surface on which the coverage area is projected. For example, a beam may have a non-circular coverage area. As another example, a circular beam that illuminates a surface with a non-perpendicular angle may project an elliptical coverage area on the surface.

Figure 11:
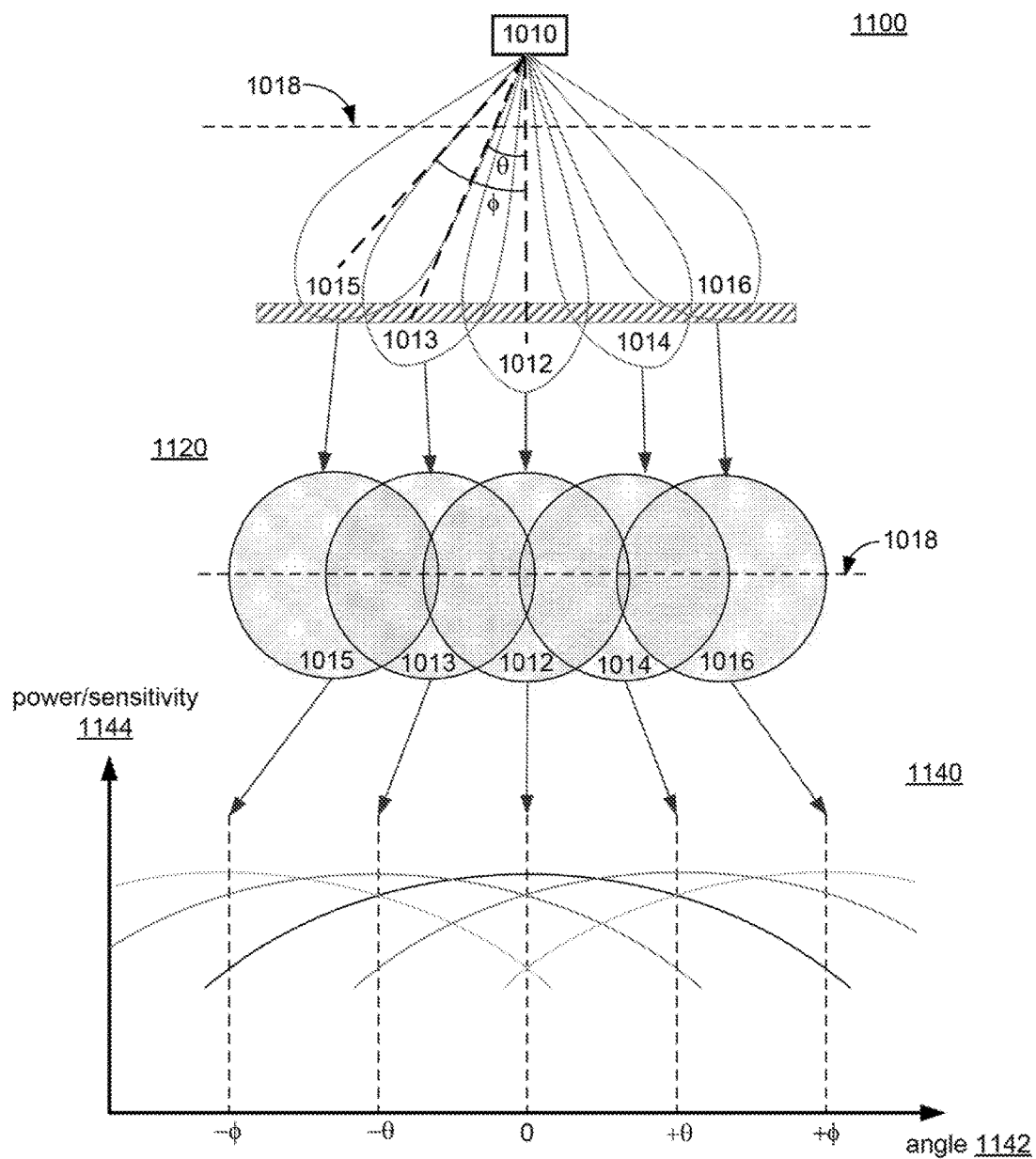
FIG. 11 depicts radiated beam power as a function of beam angle for a subset of the potential beams of the antenna array of FIG. 8.

FIG. 11 depicts receive sensitivity or beam power as a function of beam angle for a subset of the potential beams of the SBR of FIG. 10. Diagram 1100 is similar to diagram 1000, with similarly numbered elements behaving similarly. Diagram 1120 depicts a view of the overlapping areas of coverage of beams 1012, 1013, 1014, 1015, and 1016, all lying along axis 1018. Chart 1140 plots receive sensitivity or beam power as a function of beam angle. Each of the beams 1012-1016 is oriented at a particular angle, with beam 1012 oriented perpendicular to the plane of SBR 1010, beams 1013/1014 oriented at an angle θ from beam 1012, and beams 1015/1016 oriented at an angle φ from beam 1012. These angles are mapped on the horizontal axis 1142 of chart 1140. The vertical axis 1144 may represent either beam sensitivity or delivered power (or both), with sensitivity/power decreasing away from the origin. Each of the beams 1012-1016 has a sensitivity/power contour depicted as an arc in chart 1140 with a maximum at the beam's pointing angle. The contours define three-dimensional surfaces for which the receive sensitivity, beam power, or both, have a constant value. If we consider just beam power, as the tag's position moves away from the beam's pointing angle, the power decreases, reducing the beam's ability to power the tag. Alternatively, the power contour can represent the minimum power needed to power the RFID tag, and the curves in the beam's contour can represent the reduction in read range as the tag moves away from the beam's pointing angle. Of course, beam sensitivity/power may vary with beam RF frequency, tag sensitivity, desired tag operation, or myriad other RFID parameters as will be known to those skilled in the art.

Figure 12:
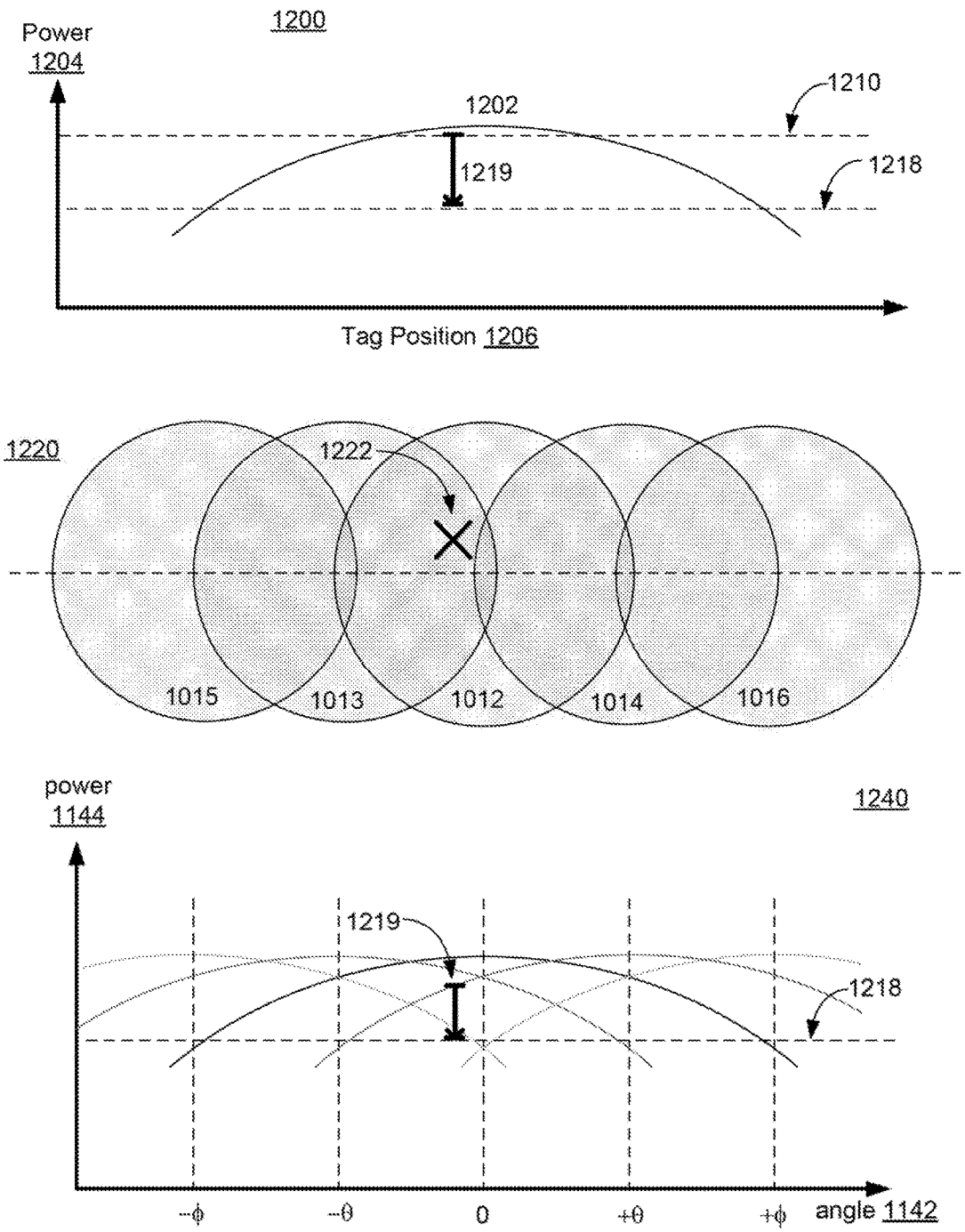
FIG. 12 depicts an RFID tag located in the subset of the potential beams of FIG. 11.

FIG. 12 is a diagram depicting an RFID tag located such that it is illuminated by a subset of the beams of FIG. 1. Chart 1200 plots beam power 1202 available to power the tag from beam 1012. Horizontal axis 1206 represents position and vertical axis 1204 power. A tag's ability to extract power from an incident RF wave varies with RF frequency, for many reasons, including the fact that a tag antenna is typically more sensitive at certain frequencies than others. Line 1210 is the power required by the tag at the worst-case (i.e. least sensitive) frequency, and line 1222 is the power required by the tag at the best-case (i.e. most sensitive) frequency. The tag is able to operate at all physical locations and frequencies for which curve 1202 lies above line 1210, and is able to operate at all physical locations and the best-case frequency for which curve 1202 lies above line 1218. Of course, there exist a continuum of lines between 1210 and 1218, representing the continuum of RF frequencies between best and worst case. This continuum of frequencies is represented by tag operating profile 1219.

Diagrams 1220 and 1240 are similar to diagrams 120 and 1140, with similarly numbered elements behaving similarly. Diagram 1240 is similar to diagram 1200, but with tag position converted from physical position to beam pointing angle. Tag 1222, shown with an "X" in diagram 1220 and 1240, is located where multiple beams overlap, and can be powered by a beam when the beam's power contour lies above line 1218 for the tag's best-case operating frequency. Line 1210 is not shown in diagram 1240 for reasons on clarity, but tag operating profile 1219 shows the range of power levels at various frequencies for which the tag is able to operate. It is clear that some beams can power the tag at all frequencies; some beams at some frequencies; and some beams at no frequencies.

Figure 13:
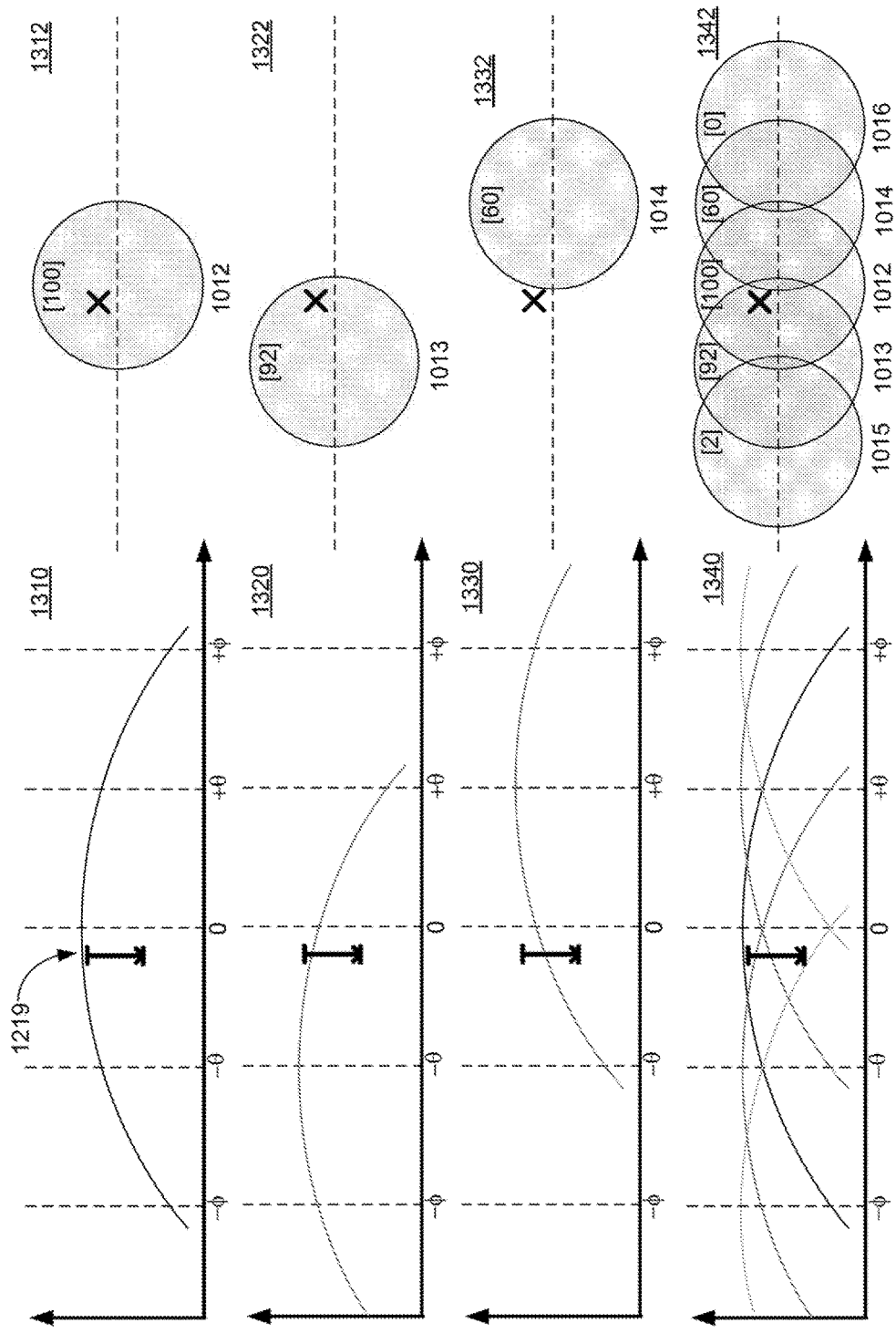
FIG. 13 depicts how the location of the RFID tag of FIG. 12 can be determined using tag sensitivity and radiated beam power.

FIG. 13 depicts how the location of the RFID tag 1222 of FIG. 12 can be determined using beam power levels. FIG. 13 includes a series of charts (1310, 1320, 1330, and 1340) and area-of-coverage diagrams (1312, 1322, 1332, and 1342) of the subset of potential beams of FIG. 12. Tag 1222 is represented as an "X" in the area-of-coverage diagrams, and tag operating profile 1219 shows the range of power levels at various frequencies for which the tag is able to operate.

Consider diagrams 1310 and 1312, which depict beam 1012 interacting with tag 1222. The entire tag operating profile 1219 lies within the contour of beam 1012 so the tag is able to operate regardless of beam 1012's frequency. For beam 1012, the SBR can read tag 1222 at each frequency, resulting in a 100% response rate with frequency, depicted as "[100]" in diagram 1312.

Turning now to beam 1013, notice that tag operating profile 1219 exceeds beam 1013's power for a small subset of frequencies. As a result, the SBR can read tag 1222 at a subset of frequencies, resulting in a 92% response rate with frequency, depicted as "[92]" in diagram 1322.

Turning to beam 1014, notice that tag operating profile 1219 exceeds beam 1013's power for a larger subset of frequencies. As a result, the SBR can read tag 1222 over a smaller subset of frequencies, resulting in a 60% response rate with frequency, depicted as "[60]" in diagram 1332.

Finally, diagrams 1340 and 1342 depict how each of the five beams 1012-1016 may interact with tag 1222. As described above, an SBR switching between beams 1012, 1013, and 1014 may have response rates of 100%, 92%, and 60% when interacting with tag 1222. For outer beams 1015 and 1016, whose contours barely overlap the tag range marker if at all, the response rates are 2% ("[2]") and 0% ("[0]"). If the SBR measures the response rate of the five overlapping beams then it can determine the beam location of tag 1222. In this specific example, beam 1012 has a 100% response rate, so tag 1222 lies somewhere within its coverage area. Beam 1013 has a larger response rate than beam 1014, so tag 1222 is closer to beam 1013 than to beam 1014. In some embodiments, the response rates can be combined, for example using a weighted averaging or centroid-averaging method, to improve the estimate of tag location. The location of tag 1222 may be further refined by using the slopes of the beam sensitivity responses compared to the tag operating profile.

Figure 14:
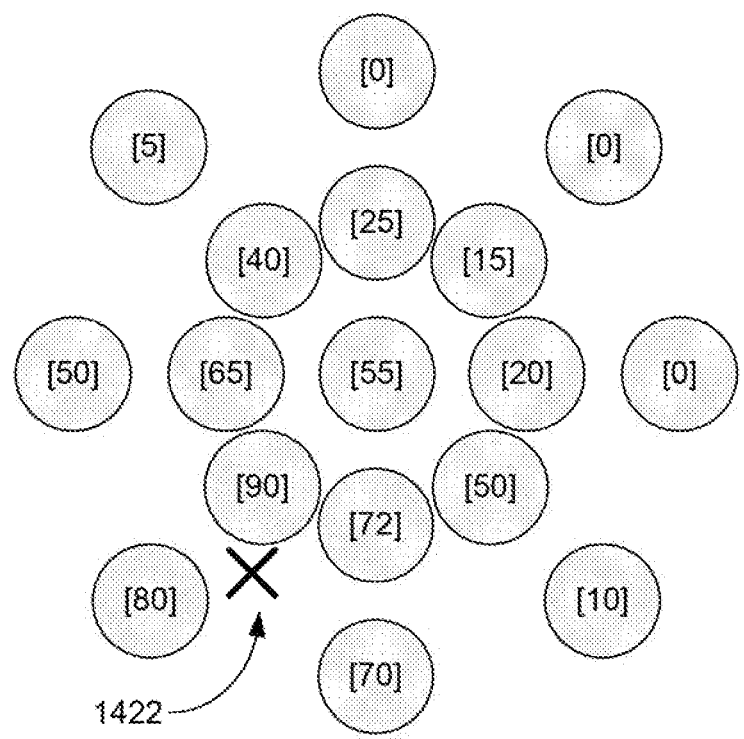
FIG. 14 depicts how a tag's location may be determined using multiple beams.

Whereas the tag location in FIG. 12 was determined, for reasons of brevity and clarity, using beams lying along axis 1018, other beams along other axes may also be used. FIG. 14 depicts how a tag's location may be determined using multiple beams in 2-dimensional space. Diagram 1400 depicts beam patterns similar to those in diagram 1080 of FIG. 10. For clarity, each beam in diagram 1400 is represented by a small shaded circle that does not necessarily represent its coverage area. Tag 1422, similar to tag 1222, is represented by an "X". Each beam has an associated tag response rate (as described in FIG. 13) represented by the bracketed number in the beam's circle. The response rate for a beam is related to the overlap between the beam's coverage and the location of tag 1422. Beams that are closer to tag 1422 have higher response rates than beams that are farther from tag 1422. The location of tag 1422 may be determined using the different response rates of the different beams.

Although FIGS. 13 and 14 show specific response rates, these values are provided for illustration, and may not correspond to actual response rates. Similarly, the relationships between the response rates provided by adjacent beams shown in FIGS. 13 and 14 are for illustration, and may differ from the actual response rates between adjacent beams.

Whereas a beam's coverage area is depicted as circular in the figures above, in some embodiments a beam's coverage area may be shaped. As one example, FIG. 15 depicts beams with elliptical shapes formed by an SBR according to embodiments.

Figure 15:
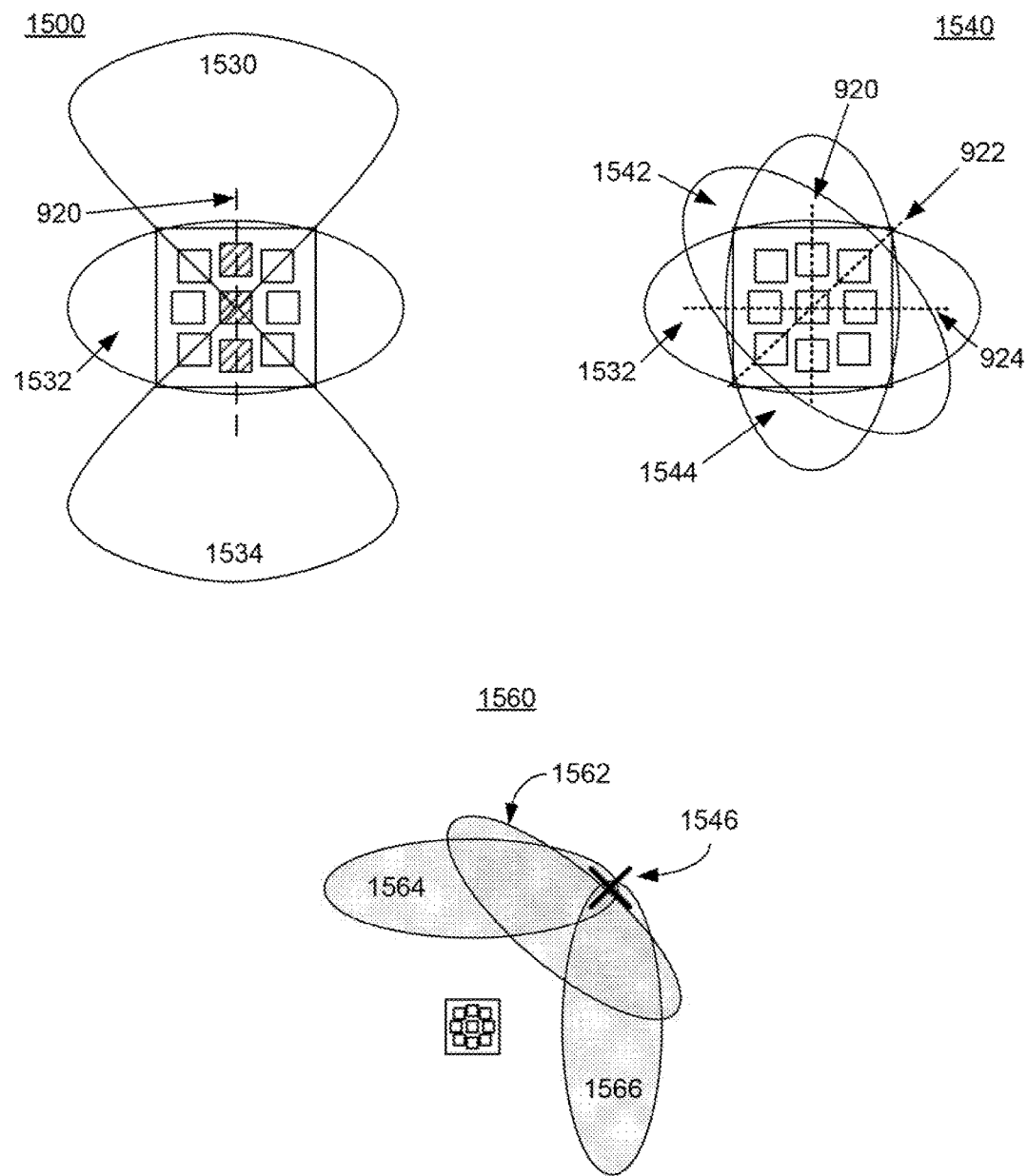
FIG. 15 depicts beams with non-circular beam shapes formed by a synthesized-beam reader according to embodiments.

Diagram 1500 in FIG. 15 is similar to FIG. 9B and depicts beams synthesized by activating antenna elements along plane 920. As described in FIG. 9B, RF beams 1530, 1532, and 1534 (similar to RF beams 930, 932, and 934, respectively) can be synthesized by supplying appropriately-phase-shifted signals to the antenna elements along plane 920. Because only 3 antenna elements are activated, in a line, the SBR of diagram 1500 is able to steer and shape a beam in the vertical direction in diagram 1500 but not in the horizontal direction. Of course, activating additional elements can shift and shape the beam in other directions. Diagram 1540 shows elements activated along line 922 to generate a beam of shape 1542, and elements activated along line 924 to generate a beam of shape 1546. Adjusting the phase of the signals provided to the antenna elements along lines 922, 924, and 926 allows steering beams to different locations, as shown in diagram 1560 for beams 1562, 1564, and 1566, respectively. As described above, a tag at location 1546 in diagram 1560 may produce different response rates with frequency to an SBR steering a beam in these various directions, allowing the SBR to determine the tag's location.

Figure 16:
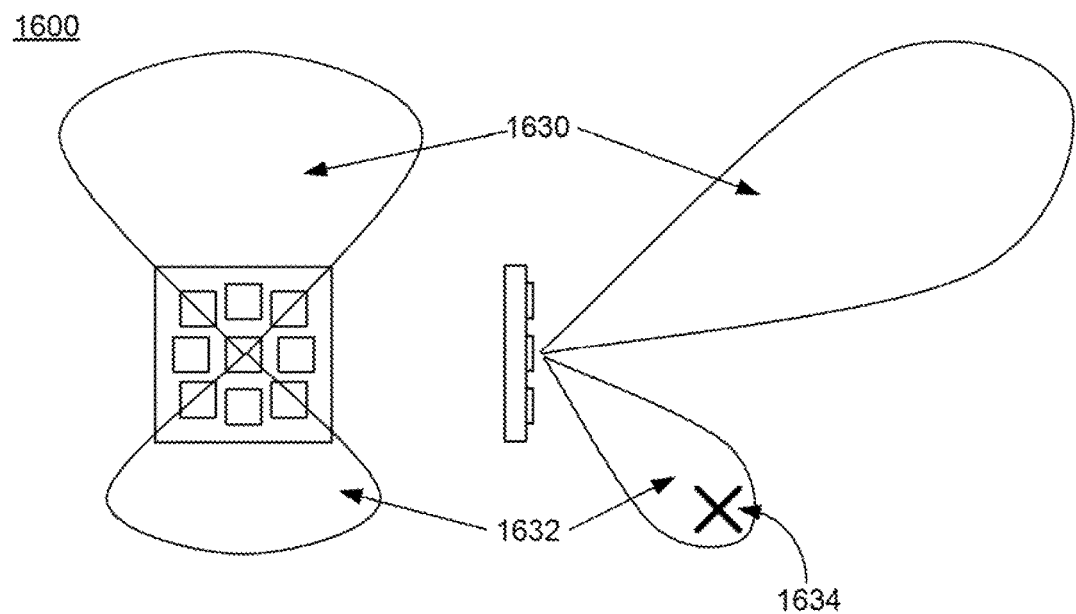
FIG. 16 depicts beams with sidelobes formed by a synthesized-beam reader according to embodiments.

All steered-beam systems generate side beams (sidelobes) in addition to the main beam. As will be known to those skilled in the an, there exist techniques to suppress these sidelobes, such as by adding more steering elements, digital beam shaping, shielding, and other methods, but none can suppress the sidelobes entirely. FIG. 16 depicts steered beams with sidelobes formed by an SBR according to embodiments. Diagram 1600, similar to FIG. 9B, depicts a head-on view to the left and a side view to the right of an SBR generating an RF beam 1630 having a sidelobe 1632, which may inventory a tag that is not positioned along the beam's main lobe. For example, beam 1630 points upward, but sidelobe 1632, pointing downward, can erroneously inventory tag 1634. Fortunately, because sidelobes have lower power than main lobes, an SBR can typically use a tag's response rate to discriminate a tag in a main beam (which will have a high response rate) from a tag in a sidelobe (which will have a low response rate).

Figure 17:
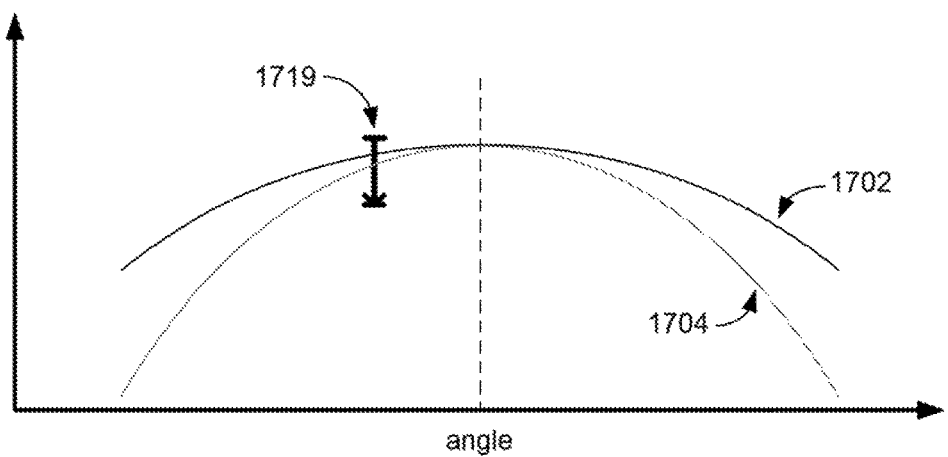
FIG. 17 depicts how frequency-based variations in beam power can be used to determine tag location.

As described above, a tag's sensitivity and response rate may vary with the frequency of the incident beam. In some embodiments, a beam's sensitivity contour may also vary with frequency. FIG. 17 depicts how frequency-based variations in a beams delivered power can be used to determine tag location. Graph 1700 is similar to graphs 1310, 1320, and 1330, and shows a beam having sensitivity contour 1702 at one frequency and sensitivity contour 1704 at another frequency. Graph 1700 also depicts a tag operating profile 1719 similar to profile 1219. By using beam profiles along with the tag response rates as a function of frequency, an SBR may be able to better estimate the tag's location.

Figure 18:
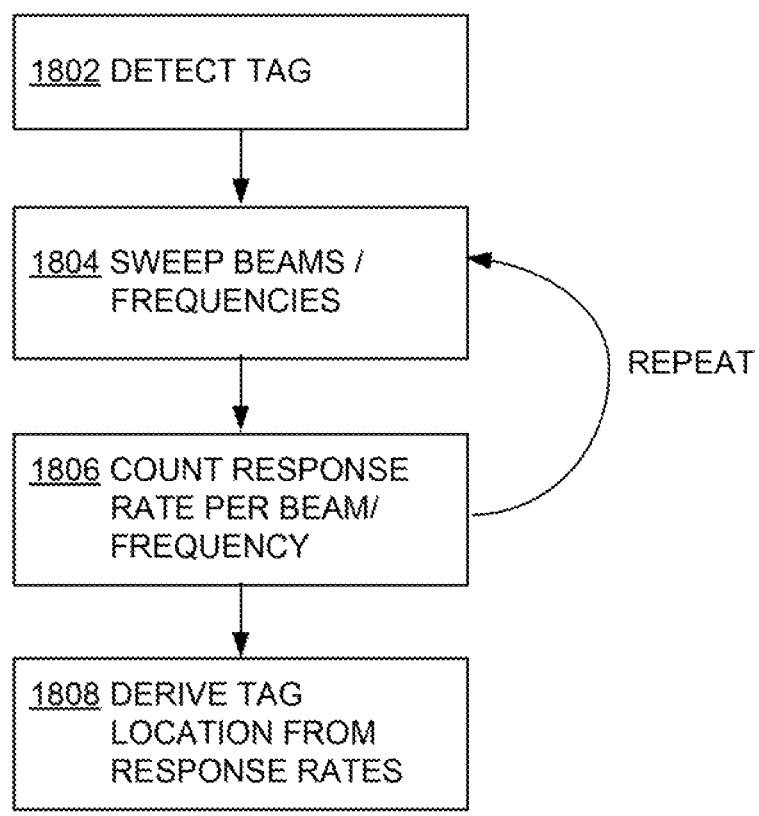
FIG. 18 depicts a process for determining tag location by counting tag reads of a synthesized-beam reader.

FIG. 18 depicts a process 1800 for determining tag location by counting tag reads. Process 1800 begins at operation 1802, where a tag is inventoried by an SBR. At operation 1804, the SBR sweeps through different beams and different frequencies for each beam, counting the tag response rate in operation 1806. For example, the SBR may generate and count tag reads using a first beam at a first frequency, then generate and count tag reads using a second beam at the first frequency, and continue this process until it has iterated through all beams. The SBR may then repeat the process for different frequencies. Alternatively, the SBR may count tag reads using a first beam at a first frequency, then generate and count tag reads using the first beam at a second frequency, and continue this process until it has iterated through all frequencies. The SBR may then repeat the process for different beams. Of course, the SBR may interleave these choices of beams and frequencies in any way imaginable, including randomly. The SBR may act adaptively/intelligently, choosing a subset of beams and frequencies that allow it to locate a tag as quickly and/or accurately as possible. The SBR may alter the polarization of its beams to reduce the impact of tag polarization when determining tag location. The SBR may combine beam/frequency data with other information, such as a map or planogram of a facility (e.g. the SBR may exclude known barriers such as walls from the potential locations for a tag) or tag type (e.g. some tags are more sensitive or directional than others. Finally, at operation 1808, the SBR uses the collected beam, frequency, read rate, and other information to determine the tag location.

A beam's ability to inventory or access a tag is based on the absolute beam power, beam power contour, beam pointing direction, beam frequency, distance to the tag, beam and tag polarization, type of tag, type of tag operation (e.g. inventory versus writing), and other parameters. A tag that lies within the SBR's tag inventory range has sufficient power to receive and respond to SBR commands, whereas a tag that lies outside the SBR's tag inventory range does not have sufficient power to receive and respond to SBR commands.

Figure 19:
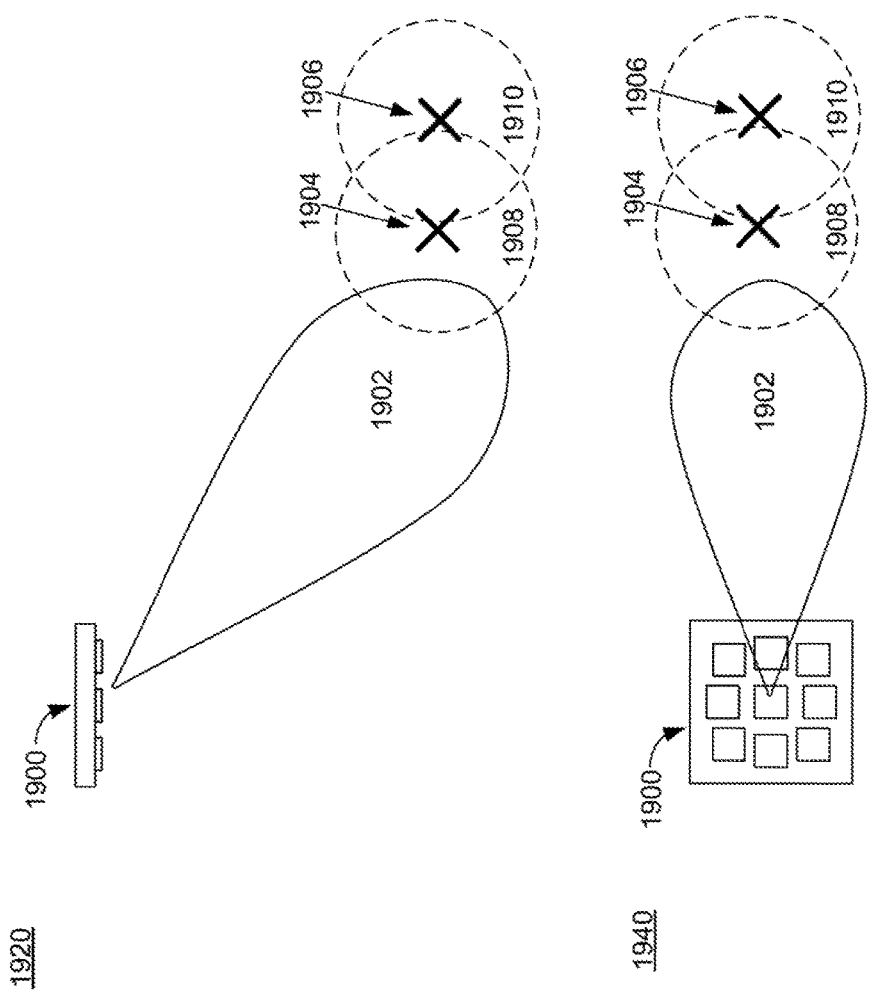
FIG. 19 depicts the effective tag inventory range of a synthesized-beam reader according to embodiments.

FIG. 19 depicts an SBR's tag inventory range according to embodiments. Diagrams 1920 and 1940 show side and head-on views of an SBR 1900 attempting to inventory tags 1904 and 1906 using a beam 1902. Each of the tags 1904/1906 has an associated sensitivity contour, labeled as 1908 and 1910, respectively. SBR 1900 can inventory tag 1904 using beam 1902, because beam 1902's power contour overlaps tag sensitivity contour 1908. SBR 1900 cannot inventory tag 1906 using beam 1902, because beam 1902 does not overlap tag 1906's sensitivity contour 1910.

Suppose that there was a way to deliver additional power to tag 1906 and thereby increase the size of its sensitivity contour 1910. A sufficiently large increase would allow beam 1902 to inventory tag 1906. Of course, one way to increase the size of tag 1906's sensitivity contour is to add a battery to tag 1906. However, it may be desirable to find a way to do so without artificial means such as a battery.

Figure 20:
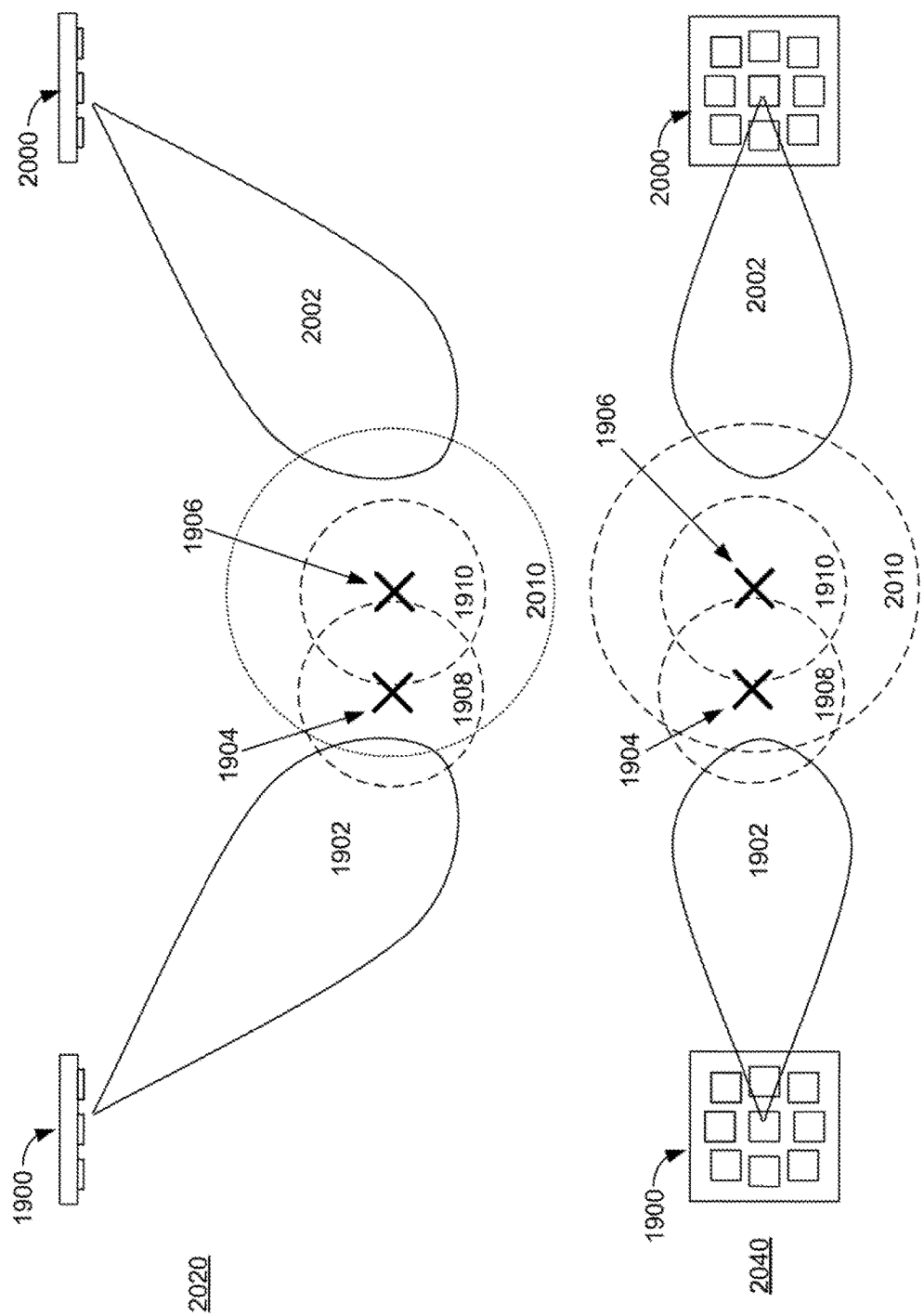
FIG. 20 depicts how a synthesized-beam reader's effective tag inventory range can be increased using another synthesized-beam reader according to embodiments.

FIG. 20 depicts how a tag's sensitivity contour can be increased by using a cooperating SBR to deliver additional RF power, according to embodiments. FIG. 20, similar to FIG. 19, depicts side and head-on views 2020 and 2040, respectively, of SBR 1900 attempting to inventory tags 1904 and 1906. FIG. 20 also includes another SBR 2000 positioned to deliver additional RF power to tag 1910 using beam 2002. In FIG. 20 as depicted, neither SBR 1900 nor SBR 2000 can inventory tag 1906 on its own, because beams 1902 and 2002 lie outside sensitivity contour 1910 of tag 1906. However, if SBR 1900 and SBR 2000 deliver RF power at the same time, then the effective sensitivity contour of tag 1906 increases from perimeter 1910 to perimeter 2010, allowing both SBR's to inventory tag 1906. In practice, there are many ways for SBR 1900 and SBR 2000 to cooperate. SBR 1900 can issue inventory commands while SBR 2000 sends raw RF power (a continuous or minimally modulated wave). Or SBR 1900 can send raw RF power while SBR 2000 issues inventory commands. Or both SBR 1900 and SBR 2000 can issue synchronized inventory commands. Regardless of the means, two SBRs can deliver more power than one, and if the two SBRs are synchronized to cooperatively provide power than tag 1906, which was invisible to either SBR singly, can become visible to one or both of them.

In some embodiments, the two SBRs may use the same RF frequency during such cooperative powering, particularly in cases where the SBRs send synchronized commands. In other embodiments, particularly those in which one SBR provides commands and the other raw RF power, the SBRs may use significantly different frequencies to avoid the RF frequencies generating beat notes that confuse the tag's demodulator (such as demodulator 442 in FIG. 4). Of course, the SBRs may optimize their choice of frequency based on beam or tag polarization, tag type, the tag's ability to reject interference such as beat notes, and other parameters. The SBR's may also adjust their relative or absolute delivered power to improve the cooperative powering. In some embodiments one of the SBRs need not be an SBR at all, but could instead be a fixed (i.e. not steered beam) reader, a handheld read, a shelf reader, a dock-door reader, or any other RFID reader as will be known to those skilled in the art. In some embodiments a controller and/or one or both of the SBRs can adjust the power and/or frequency of the generated RF signal(s) to increase the inventorying range of the RFID tag. In some embodiments the adjustment may include sweeping over a range of power and/or frequency values; in other embodiments the adjustment may be adaptive and based on environmental conditions (for example, RF noise or the dielectric properties of items to which tags are attached), received tag replies, tag performance characteristics (for example, sensitivity, interference rejection or ability to harvest power from another RF source), and/or tag population size. In some embodiments, one of the SBRs will point to the target location and another SBR may steer its beam to multiple locations in the vicinity of the target location to improve the cooperative powering.

Of course, the benefits of cooperative tag powering need not be limited to a pair of SBRs. FIG. 21 depicts how multiple SBRs can cooperate to inventory a tag population according to embodiments. Diagram 2100 depicts four SBRs 2102, 2104, 2106, and 2108 arranged to inventory a tag population 2110. In diagram 2100, SBR 2102 is configured to communicate with tags 2110 using beam 2112, while SBRs 2104-2108 are configured to provide power to tags 2110 using beams 2114, 2116, and 2118, respectively. In diagram 2150, SBR 2108 is instead configured to inventory tags 2110 using beam 2118, while SBRs 2102-2106 provide additional power. Of course, any of the SBRs can do the inventorying while the others deliver power, or two can inventory (synchronously or not) while the other two deliver power, or any other possibility. Of course, the number of SBRs is arbitrary—four are shown but more or less can be used in actual practice.

In some embodiments a controller, such as controller 2120 in diagrams 2100 and 2150, can perform SBR coordination to cooperatively inventory and power tags using SBRs 2102, 2104, 2106, and 2108. In other embodiments controller 2120 can be embedded within one or more of the SBRs. In yet other embodiments the SBRs can form a peer-to-peer communication network and synchronize with each other.

In general, an SBR synthesizes an RF beam to point at locations (e.g. beam areas-of-coverage shown in FIG. 10), for durations, and at times according to a scanning pattern, which may be predetermined or dynamic. A pointing location can be identified by the one or more SBRs as a beam indicator (such as a numeric indicator), a location on the floor of a facility in which the SBRs are located, a set of Cartesian or polar coordinates, or any other suitable location identifier.

In some embodiments, the scan pattern is a sequence of target locations and an SBR may synthesize beams to point at the different target locations based on a timer, a trigger signal generated by the SBR or a controller, and/or communications from one or more other SBRs. In some embodiments, the scan pattern is at least one target location and at least one corresponding target-location time, defined as the time at which two different SBRs point to the target location. The target-location time may be absolute (for example, 4:00 pm) or relative (for example, ten milliseconds after a trigger or timer signal or communication). An SBR may store the scan pattern in memory, receive a scan pattern from a controller (e.g., controller 2120, another SBR, a network device, or some other controlling entity), generate a scan pattern using information received from a controller or other SBRs, generate a scan pattern randomly, generate a scan pattern to optimize tag cooperative powering, or generate a scan pattern based on any other suitable parameter(s). In some embodiments, an SBR's scan pattern may be overridden temporarily (or permanently) by a controller or another SBR.

The assignment of roles (inventorying or powering) to different SBRs may depend on history (i.e. whether an SBR was most recently an inventorying SBR or a powering SBR), the SBR's location, the number of tags the SBR has inventoried recently or historically, the number of tags all or a subset of the SBRs have inventoried, or any other number or type of suitable parameters. In some embodiments the SBR role assignments may be preset—for example, a particular SBR may be assigned to inventory for a period of time, provide power for another period of time, and then repeat. In other embodiments SBR role assignments may be dynamic or adaptive, even during an ongoing communication with a tag. For example, one reader may begin and then interrupt a dialog with a tag. Another reader may then continue the interrupted dialog with the tag while the original reader provides power or performs some other task.

In some embodiments, SBRs may be configured to cooperatively power tags only in certain circumstances. For example, if one SBR is using one of its outer beams to inventory tags then other SBR may cooperatively power the tags, knowing that cooperative powering is particularly effective when used with outer SBR beams. As another example, if a tag is moving toward the periphery of an SBR's field-of-view (and therefore into its outer beam coverage), other SBR may cooperate to provide additional power. As yet another example, if the number of inventoried tags is less than an expected number, other SBRs may provide additional power to boost tag sensitivity and thereby allow more tags to be inventoried. As yet another example, if a tag indicates that it has insufficient power to perform an operation, such as writing data to memory, other SBRs may provide additional power so the tag can perform the operation.

Figure 22:
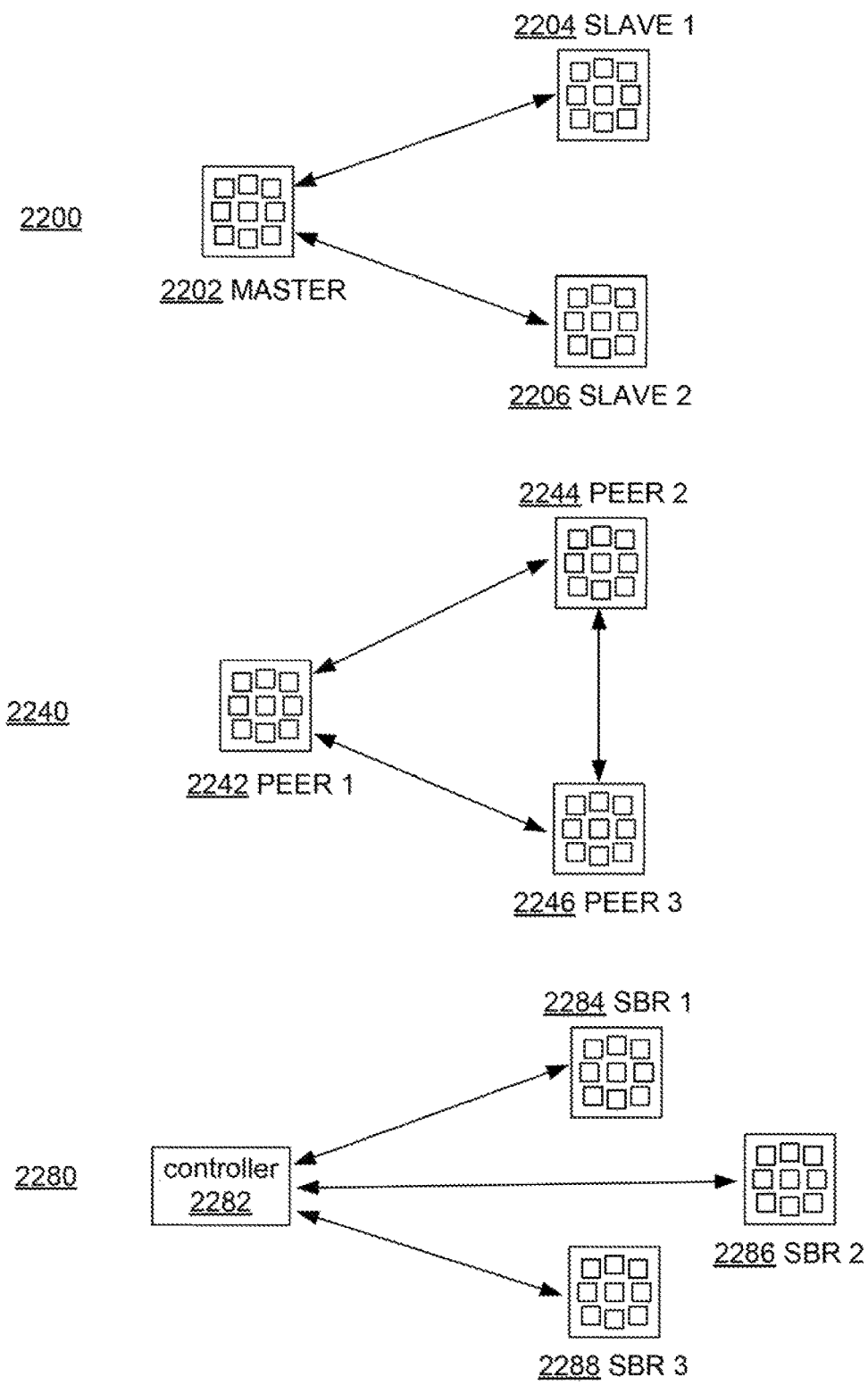
FIG. 22 depicts methods of controlling multiple synthesized-beam readers according to embodiments.

As described above, SBRs may be configured to receive and/or exchange information about target locations, scan patterns, scan timing, beam configuration, tags, cooperative powering, and roles. FIG. 22 depicts a variety of ways in which SBRs can receive and/or exchange such information. Diagram 2200 depicts a first configuration in which a master SBR 2202 coordinates the operations of two slave SBRs 2204 and 2206. Diagram 2240 depicts a second configuration in which three SBRs, 2042, 2044, and 2046 coordinate operation via peer-to-peer communications. Diagram 2280 depicts a third configuration in which a centralized controller 2282 coordinates the operations of three SBRs 2284, 2286, and 2288. Of course, multiple variants on these themes are possible including using more or less SBRs; mixing the configuration (for example, a controller coordinating peer-to-peer communications); using multiple controllers, and endless other combinations as will be obvious to those of ordinary skill in the art. Communication between SBRs and controllers (if present) can be implemented using a wired connection (e.g., Ethernet, parallel, serial, or other suitable wired protocol), a wireless connection (e.g. WiFi, cellular. Bluetooth, or other suitable wireless protocol), a point-to-point protocol, a packet or address-based protocol, or any other suitable connection type or protocol.

Figure 23:
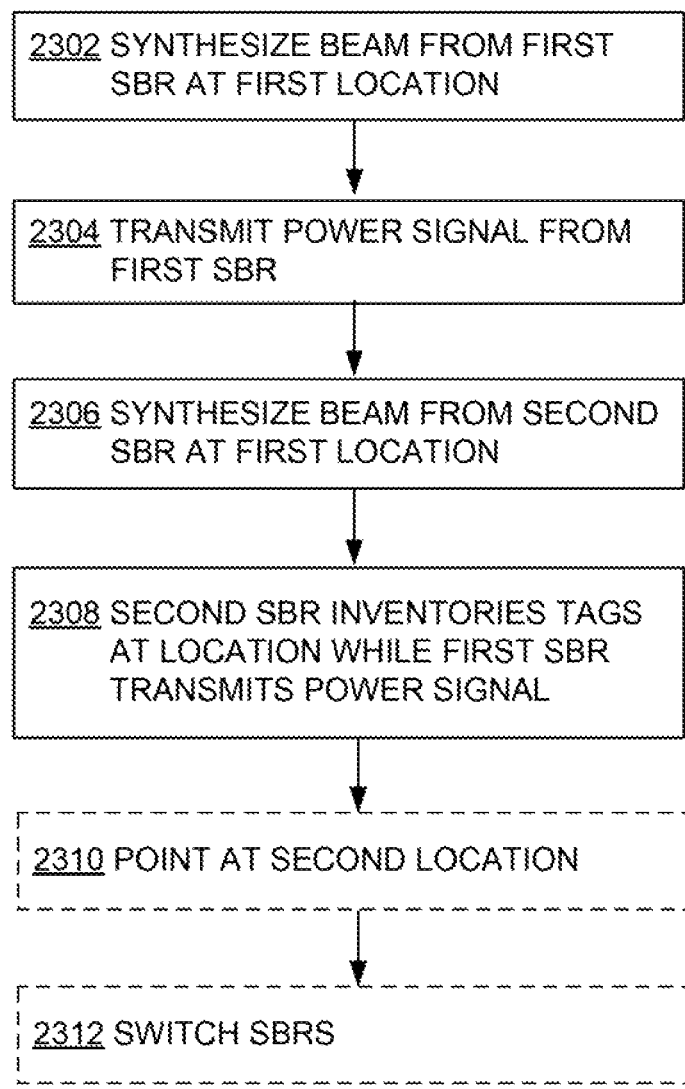
FIG. 23 depicts a process for using cooperating synthesized-beam readers to enhance tag inventory range according to embodiments.

FIG. 23 depicts a process 2300 for coordinating SBR operation according to embodiments. Process 2300 begins at operation 2302, where a first SBR (e.g., SBR 2000) synthesizes a beam (e.g., beam 2002) to point at a first location. At operation 2304, the first SBR transmits a minimally modulated (power) signal. At operation 2306, a second SBR (e.g., SBR 1900) synthesizes a beam (e.g., beam 1902) to also point at the first location. At operation 2308, the second SBR inventories one or more tags at the first location while the first SBR continues to transmit power. At optional operation 2310, first and second SBRs repeat the above operations while pointing at a second location, for example as described above in FIG. 21. At optional operation 2312 the first and second SBRs may switch roles, with the first SBR inventorying tags while the second SBR transmits power. Of course, in other embodiments more than two SBRs may participate in process 2300.

The SBR functionality described above may be combined with tag population management techniques to improve inventory performance and detect tag movement. One such tag population management technique is a tag refresh, also described in copending U.S. patent application Ser. No. 13/271,937 entitled "Broadcast Refresh of RFID Tag Persistence," which is hereby incorporated by reference in its entirety. Many RFID systems expect a reader, such as an SBR, to inventory all the tags in a population. Typically, the reader inventories a first tag, instructs the tag not to reply for a period of time (a persistence time), and then proceeds to inventory a second tag. In typical embodiments the reader instructs the first tag, either explicitly or implicitly, to set a flag (an inventoried flag, which is usually a semi-persistent bit value stored on the tag) from a default or "unset" value to a "set" value, thereby indicating that the tag has been inventoried. After some time (the flag persistence time), the flag typically decays back to the default value. In an ideal world, the reader would continue the process until it has inventoried all of the tags. Unfortunately, if the reader has not finished inventorying all of the tags within the persistence time then the first tag will forget that it has already been inventoried (i.e., its inventoried flag will decay to its default value) and present itself to be inventoried again. Subsequently, a second tag may exhibit the same behavior, followed by other tags. If the tag population is large then the reader may spend so much time re-inventorying already-inventoried tags that it cannot spend enough time searching for the hard-to-inventory tags. As a result, some of the tags in the population may not be inventoried at all.

Figure 24:
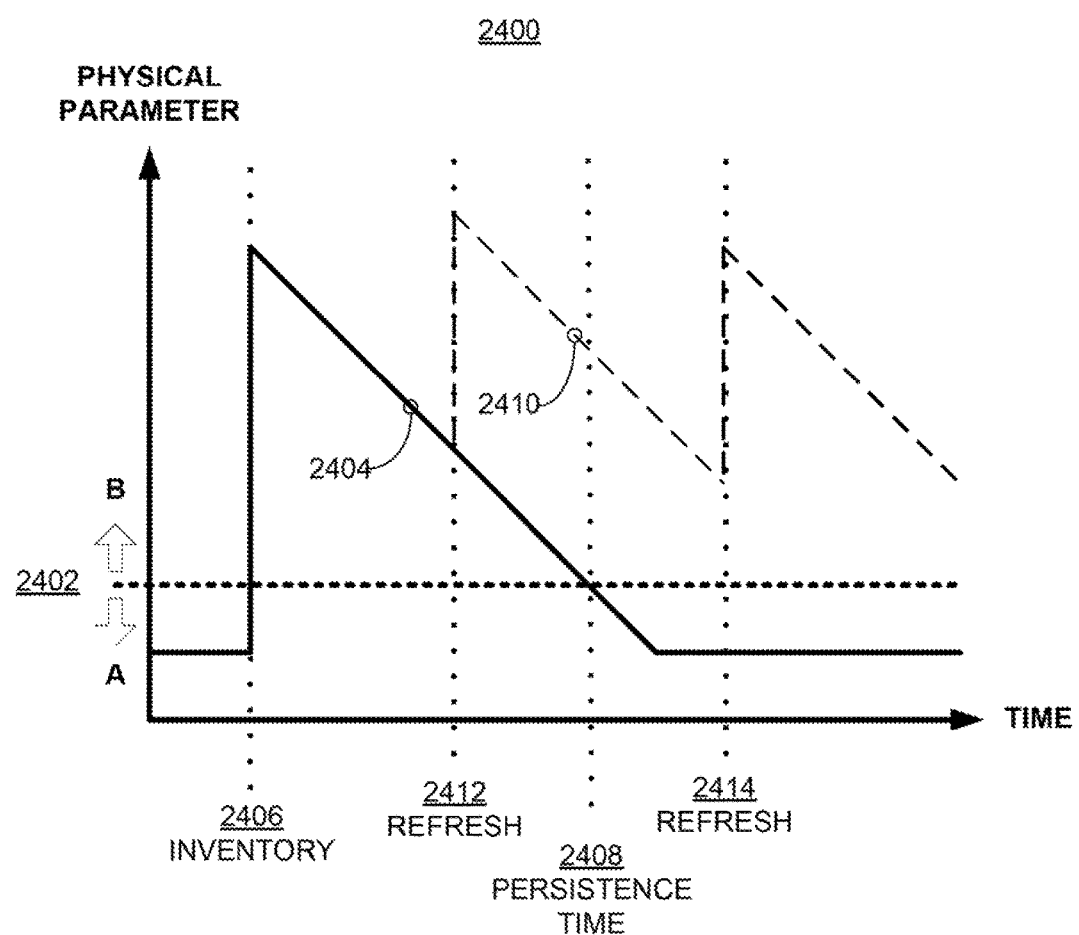
FIG. 24 is a diagram showing the effects of a broadcast refresh on tag flag physical parameters as a function of time, according to embodiments.

FIG. 24 is a diagram 2400 showing the effects of a tag refresh on a physical flag parameter as a function of time, according to embodiments. A flag parameter may include one or more of voltage, current, charge, and flux associated with a tag flag. In some embodiments, if the value of a flag parameter is below a threshold 2402 then the flag is considered to hold a first value (for example, the value "A"), whereas if the value of the parameter is above the threshold 2402 then the flag is considered to hold a second value (e.g., the value "B"). During an inventory operation 2406 the flag parameter may be switched. Although the inventory operation 2406 in FIG. 24 asserts the tag flag value from "A" to "B", in other embodiments an inventory operation may assert the tag flag value from "B" to "A". The amount by which the flag physical parameter is adjusted during a switching operation may be static (e.g., always increased/decreased by a preset amount) or dynamic (e.g., the amount of the increase/decrease varies according to any number of parameters), as long as the adjustment amount is sufficient to change the flag value.

After inventory operation 2406 switches the flag value from A to B, the flag physical parameter will begin decaying, as indicated by curve 2404. At some point in time 2408 the flag physical parameter will have decayed below threshold 2402, switching the flag value from B back to A. The difference between time 2408 and time 2406 is the flag's persistence time, and is how long the flag holds the value B. The rate at which the physical parameter decays may be a function of one or more tag and/or environmental conditions, such as tag design or temperature.

If a tag is capable of executing a flag refresh, and a reader transmits a refresh command 2412 to the tag before time 2408 (i.e. before the physical parameter decays below threshold 2402), then the refresh command 2412 adjusts (or instructs the tag to adjust) the physical parameter to increase the flag persistence time. As above, the amount of the adjustment may be static or dynamic, as long as the post-refresh value is different from the value before the refresh command. By transmitting successive refresh commands (e.g., refresh command 2413 followed by refresh command 2414) the resulting decay curve 2410 can be adjusted such that the effective flag persistence time (i.e., the time before which curve 2410 drops below the threshold 2402) can be extended as far beyond the normal flag persistence time as desired. A reader may transmit the refresh command 2412 to individual tags or may broadcast the refresh command 2412 to multiple tags simultaneously. The term "broadcast" as used herein implies that the command is directed to multiple tags rather than to a singulated tag.

Figure 25:
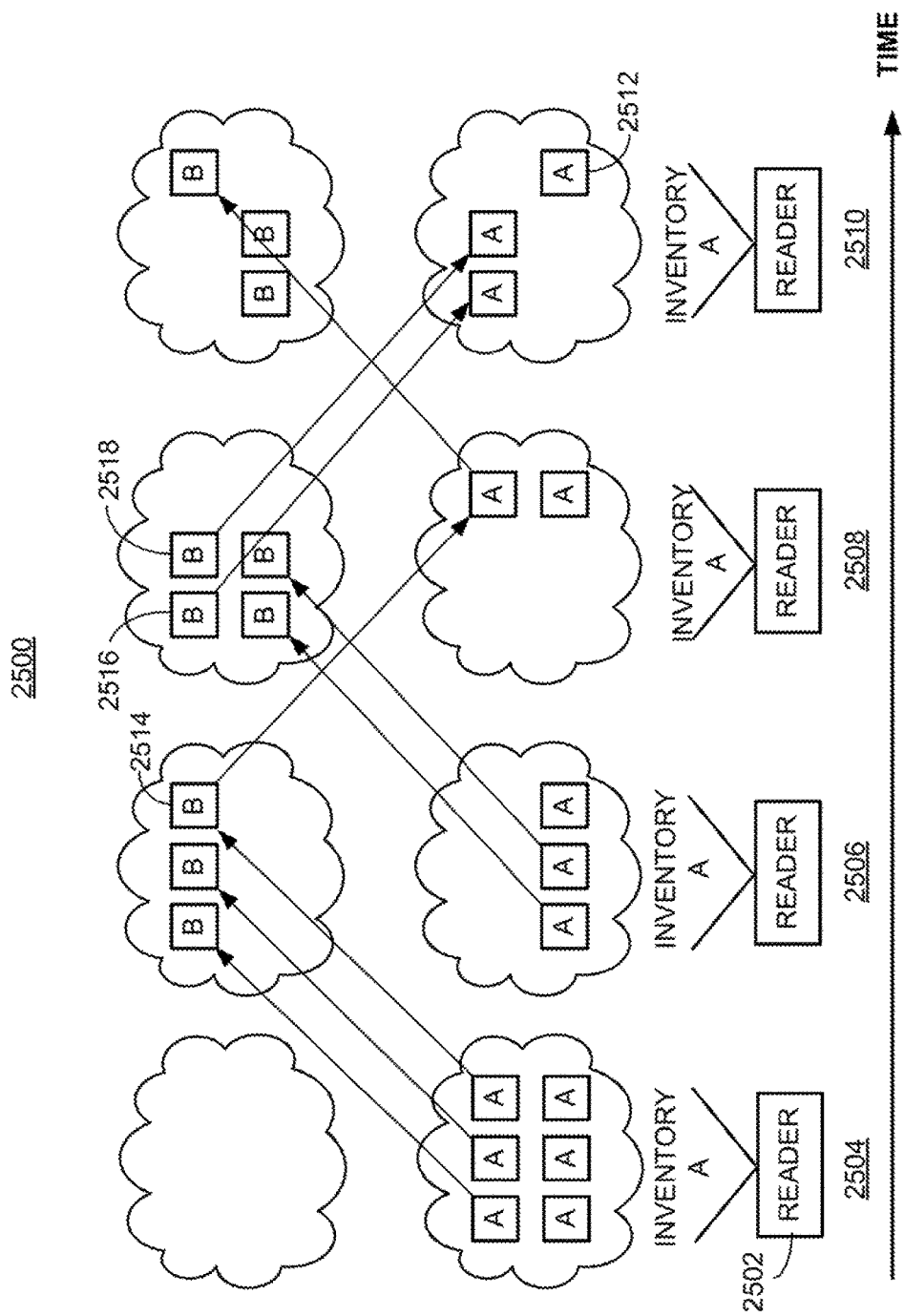
FIG. 25 is a conceptual diagram showing an illustrative inventorying process without broadcast refresh according to embodiments.

FIG. 25 is a conceptual diagram showing an illustrative inventorying process 2500 without refresh according to embodiments. The inventorying process 2500 begins at the left and proceeds to the right along the horizontal TIME axis. At time 2504, all tags have inventoried flag values of "A" and the reader 2502 begins inventorying "A" tags. At time 2506, three tags have been inventoried by reader 2502 and their inventoried flag values have been switched to "B", but three tags have not yet been inventoried by reader 2502 and their flag values remain as "A". After time 2506, the reader inventories an additional two tags and switches their flags to "B". However, the flag value of one of the previously-inventoried tags 2514, possibly the first tag inventoried, exceeds its persistence time and decays back to "A" after time 2506. As a result, at time 2508, while five of the six tags have been inventoried, reader 2502 still has two tags in the "A" state that it needs to inventory. After time 2508, the reader 2502 manages to re-inventory tag 2514 and switch its flag value back to "B", but in the meantime previously-inventoried tags 2516 and 2518 have decayed back to "A". Thus, at time 2510, although reader 2502 has inventoried five of the six tags, it has not yet inventoried the last tag 2512, and it may not be able to devote sufficient time to inventory tag 2512 if the previously inventoried tags keep decaying.

Figure 26:
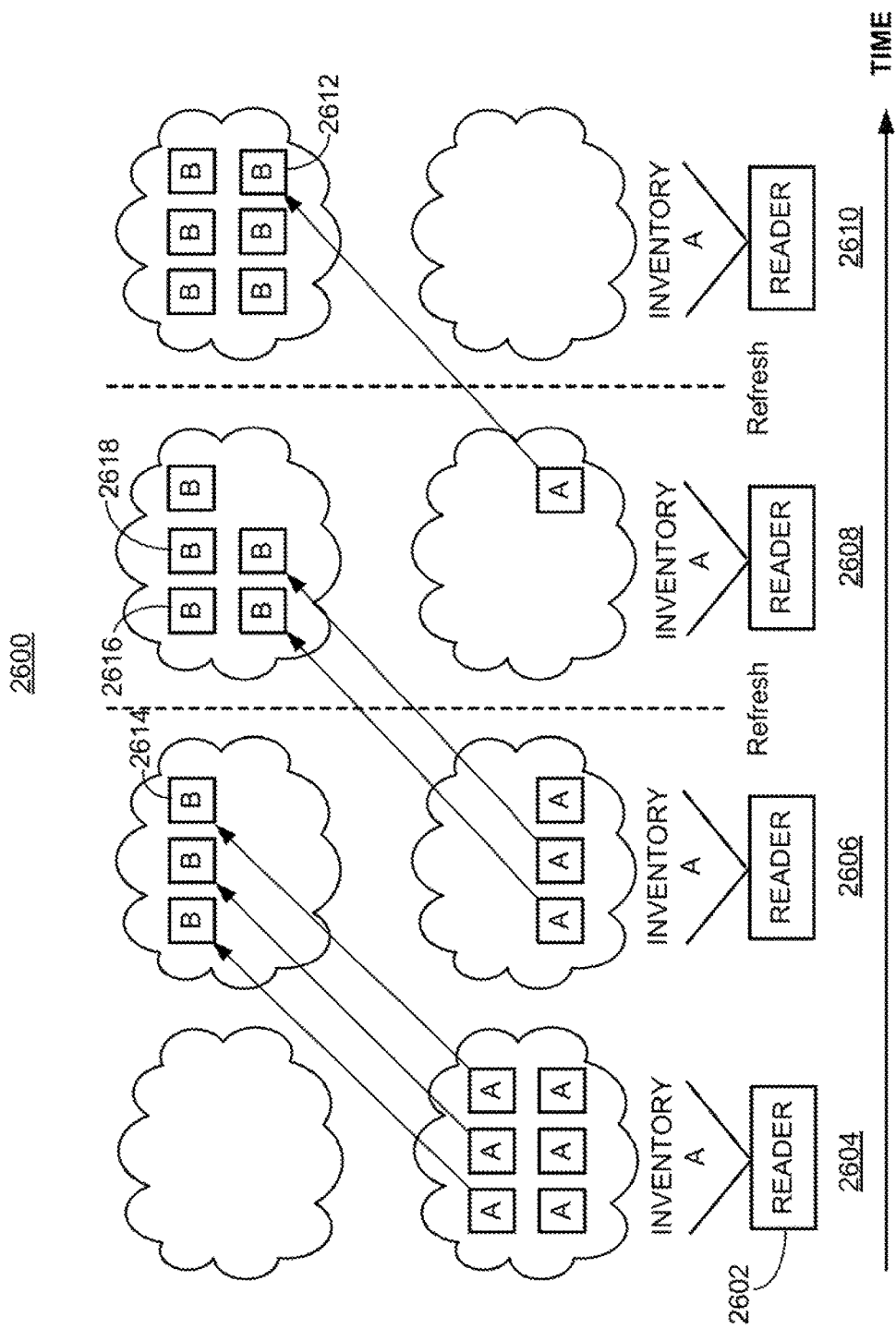
FIG. 26 is a conceptual diagram showing an illustrative inventorying process with broadcast refresh according to embodiments.

FIG. 26 is a conceptual diagram showing an illustrative inventorying process 2600 with refresh according to embodiments. As with inventorying process 2500 described above in relation to FIG. 25, the inventorying process 2600 begins at time 2604 (similar to time 2504 in FIG. 25) and proceeds to time 2606 with three tags inventoried, similar to time 2506 in FIG. 25. Differently from FIG. 25, after time 2606 reader 2602 transmits or broadcasts a refresh command, and tag 2614's flag value does not decay back to "A" but instead stays in "B" (differently from tag 2514's flag value in FIG. 25, which does decay). As a result, at time 2608, live of the six tags have been inventoried, and none have decayed back to the "A" state. At time 2608, reader 2602 is able to devote sufficient time to inventory the last tag 2612, and a refresh command after time 2608 prevents tags 2616 and 2618 from decaying back to the "A" state at time 2610 (compare to tags 2516 and 2518 in FIG. 25, which do decay back to "A"). Thus, the commanded refresh functionality allows reader 2602 to spend more time searching for and inventorying uninventoried tags instead of inventorying previously inventoried tags.

The refresh functionality described above need not be used only while actively inventorying tags. For example, a reader may broadcast refresh signals to already-inventoried tags while waiting for other tags to enter its field-of-view. The refresh functionality may also be used to assist in managing different populations of tags. For example, a reader may inventory a first population of tags in a first session and use broadcast refresh signals to maintain the values of the tag flags associated with the first session. The reader may then inventory a second population of tags in a second session different from the first, while continuing to broadcast refresh signals to maintain the flag values of tags in the first population. The sessions concept is described in the UHF Gen2 Specification.

Figure 27:
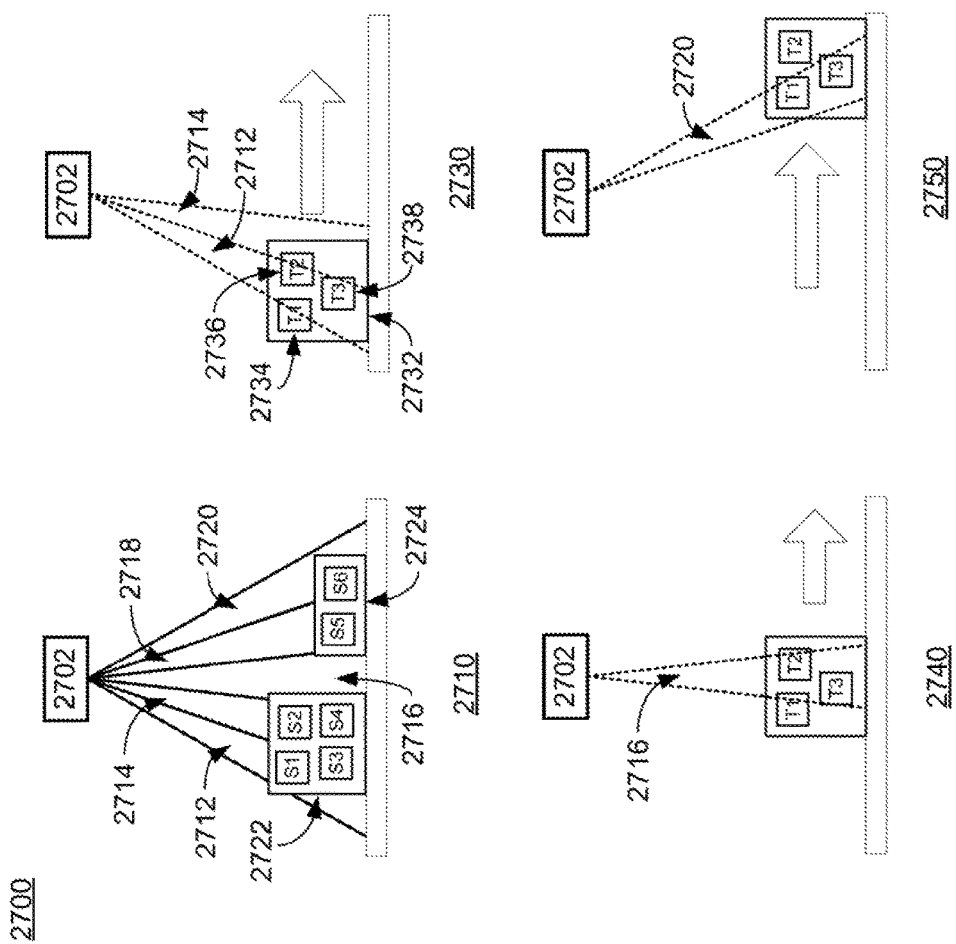
FIG. 27 is a conceptual diagram showing side views of a synthesized-beam reader at different stages of a tag motion-tracking process according to embodiments.

As suggested above, this refresh functionality may assist in determining the direction of a tag's movement in an environment that contains multiple other tags. FIG. 27 is a conceptual diagram 2700 showing side views of an SBR system at different stages of a tag motion tracking process according to embodiments.

In diagram 2700, an SBR 2702 is configured to generate outer RF beams 2712, 2714, 2718, and 2720, and a central RF beam 2716. SBR 2702 typically scans among its different beams 2712-2720 (and also between other beams not depicted in FIG. 27) continuously, to look for tags within its coverage area (e.g., as depicted in diagram 1080).

At stage 2710 of the tag-motion tracking process, SBR 2702 first inventories stationary tags S1-S4 in container 2722 and stationary tags S5-S6 in container 2724 in a first session. SBR 2702 then broadcasts a refresh signal to the stationary tags to keep them quiet in the first session. In some embodiments, these stationary tags may also be inventoried in a second session. In some embodiments the inventoried flags in the second session do not decay while the tags receive power.

At subsequent stage 2730, a container 2732 with tags of interest (TOIs) 2734, 2736, and 2738 moves rightward into SBR 2702's coverage area. As they enter the coverage area, SBR 2702 inventories these TOIs with outer RF beams 2712 and 2714, using the second session for the inventorying. Upon observing these new, previously unseen TOIs, SBR 2702 begins a tracking process that includes using an alternative session that is different from the second session (such as the first session, although any session other than the second may be used).

An inventorying process (such as described in the UHF Gen2 Specification) involves a series of steps involving the exchange of information between a reader (such as SBR 2702) and a tag. The process causes state changes in the reader and/or tag—for example, the reader may request an identifier from the tag, the tag may reply with its identifier, the reader may acknowledge receipt of the identifier, and the tag may then assert an inventoried flag in response to the acknowledgement. In some embodiments a reader may wish to inventory a tag without causing the tag to assert its inventoried flag. The reader may accomplish non-acknowledgment by beginning the inventorying process as described above, but either not acknowledge receipt of the tag-provided identifier or transmitting a non-acknowledgement command to the tag. The NAK command in the UHF Gen2 Specification is one such non-acknowledgment command.

At stage 2740, SBR 2702 inventories tags with central beam 2716 using the alternative session. Because TOIs 2734-2738 have not yet been inventoried in the alternative session, their inventoried flags should be in the A state (i.e. denoting not inventoried), and they should respond to SBR 2702. When SBR 2702 receives an identifier from one of these TOIs 2734-2738, which it previously determined to be new and of-interest, SBR 2702 transmits a non-acknowledgement command to the TOI, thereby causing the TOI not to change the state of its inventoried tag and thus facilitating subsequent reinventorying. Moreover, because SBR 2702 previously inventoried the TOI with its outer RF beams and is now inventorying the TOI with its central RF beam, it may infer that the TOI has moved from the coverage area of outer RF beams 2712/2714 to the coverage area of central RF beam 2716.

As mentioned above, an RFID reader (such as SBR 2702) may unintentionally miss (i.e. not inventory) a tag (such as one of TOIs 2734-2738) in one of its beams. To compensate for such misses, SBR 2702 may associate TOIs that it believes to be traveling together, such as TOIs 2734-2738, in a set. SBR 2702 may form this belief from the fact that it inventoried TOIs 2734-2738 at the same time, from tracking TOIs 2734-2738 moving together for a period of time, from information provided to it about TOIs 2734-2738, from similar TOI identifiers, or from other information or sources or characteristic of the TOIs. By assuming the association among the TOIs, even if SBR 2702 misses one of the TOIs in a beam, such as in beam 2740, it may still assume that the missed TOI is moving with the others in the set.

At stage 2750, SBR 2702 inventories TOIs 2734-2738 with outer RF beam 2720. Similar to stage 2740, SBR 2702 may inventory the TOIs in the alternative session and, after receiving a TOI identifier and determining that the TOI was previously inventoried, may transmit a non-acknowledgement command to the TOI.

In the example of FIG. 27, by first inventorying the tag in the second session, with all static tags already in the B state, SBR 2702 can quickly identify new TOIs. By using non-acknowledgment commands in the alternative session, SBR 2702 can continue to observe the TOIs in a sea of static tags. By tracking a TOI across beams 1212, 2714, 2716, and 2720, SBR 2702 and may infer that a TOI is moving.

Whereas the example in FIG. 27 depicts tracking TOIs moving linearly in one direction (rightward), SBR 2702 may be configured to track TOIs moving in other directions, in linear or nonlinear paths. For example, SBR 2702 can be configured to track TOIs that enter its coverage area along one axis and leave along another (i.e., TOIs that change movement direction within the SBR coverage area). Similarly, SBR 2702 can be configured to track TOIs that move in a curved path.

Figure 28:
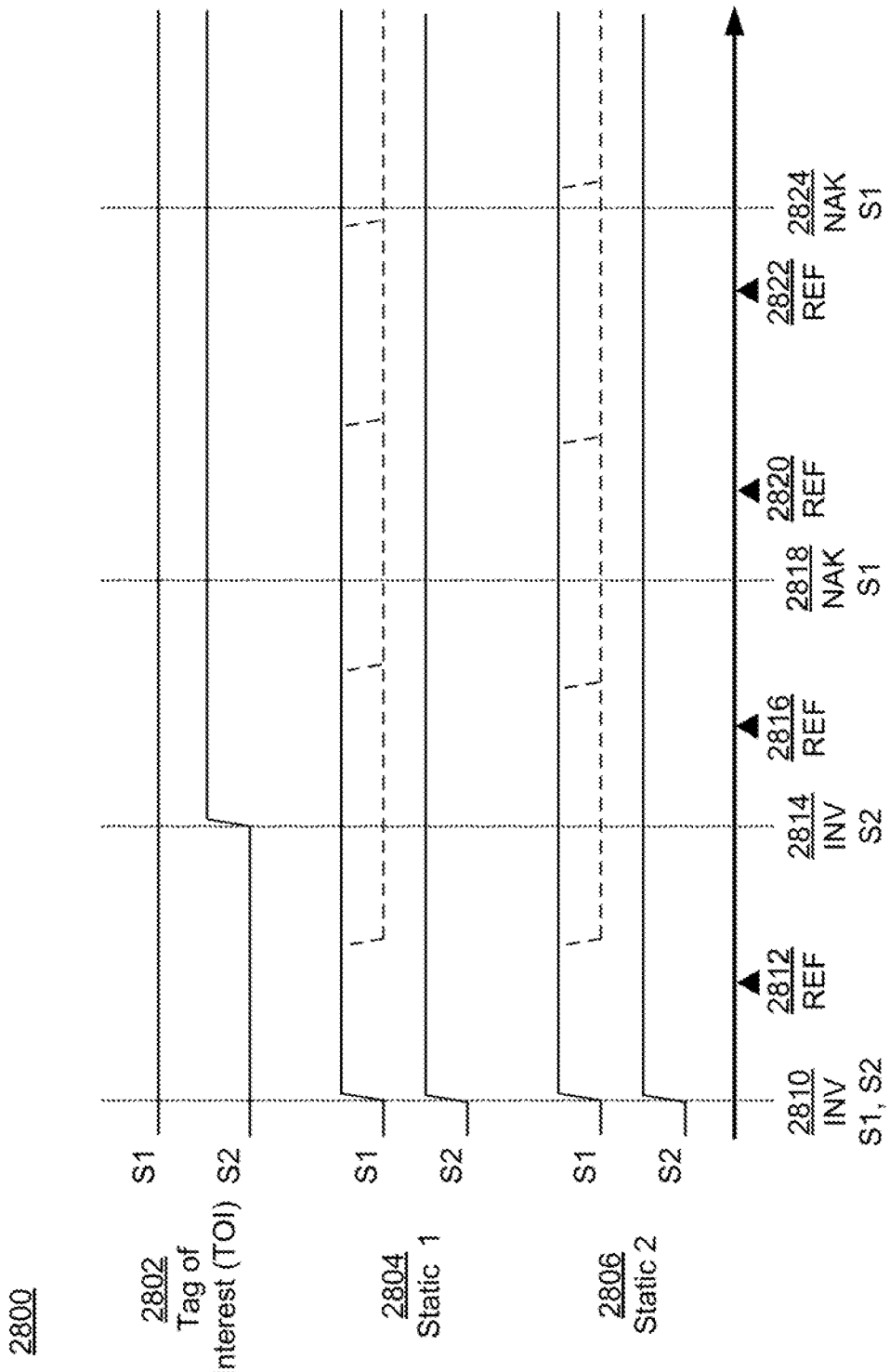
FIG. 28 depicts a timing diagram for a tag tracking process with tag refresh commands according to embodiments.

In some embodiments, an SBR may use tag refresh commands as described above to assist in tag tracking. For example, SBR 2702 may use refresh commands to maintain the inventoried flags of the static tags in containers 2722 and 2724. FIG. 28 shows a timing diagram 2800 for a tag tracking process with tag refresh commands according to embodiments. Timing diagram 2800 displays the values of the session one (S1) and two (S2) flags a TOI 2802 and two static tags 2804 and 2806. In timing diagram 2800, a flag is asserted when its value is high and not asserted when its value is low. The horizontal axis of the timing diagram 2800 represents time, with events to the left preceding events to the right.

At initial time 2810, an SBR inventories static tags 2804 and 2806 in both S1 and S2 sessions and instructs them to assert their S1 and S2 flags. Whereas timing diagram 2800 depicts these tags being inventoried in both sessions at the same time, in typical embodiments the tags are first inventoried in one session and then in the other session.

At subsequent time 2812, the SBR transmits a refresh command to static tags 2804 and 2806 as described above. Without the refresh command at time 2812, the S1 flags of static tags 2804/2806 would decay (as depicted by the dotted curves) shortly after time 2812. In the depicted embodiment, the S2 flags of the static tags 2804/2806 do not decay, because a tag's S2 flag value persists when the tag is powered (as described in the Gen2 Specification).

At time 2814, the SBR inventories TOI 2802 in session S2 and causes its S2 session flag to be asserted as a result of being inventoried.

At time 2816 the SBR transmits another refresh command to static tags 2804/2806 to maintain their S1 flag values, which would otherwise decay.

At time 2818, the SBR inventories TOI 2802 in session S1. After receiving an identifier from TOI 2802, the SBR transmits a non-acknowledgement command (such as a Gen2 NAK command), causing TOI 2802's S1 session flag to remain deasserted.

At times 2820 and 2822 the SBR transmits refresh commands to maintain the S1 session flag values of static tags 2804 and 2806. At time 2824, the SBR again inventories TOI 2802 in session S1 and terminates the inventorying process by transmitting a NAK command, leaving TOI 2802's S1 session flag of deasserted.

By first using session S2 to find TOI 2802 among static tags whose S2 session flags are held asserted by being powered, and then using session S1 and NAKs to read TOT 2802 multiple times among static tags whose S1 session flags are refreshed, the SBR is able to inventory TOI 2802, in multiple beams as described above, and track its movement. Of course, the above session-flag choices are arbitrary—session flags S1 and S2 could be swapped, or session flag S3 could be used instead of session flag S1, or session flag S3 could be used instead of session flag S2, or the tags could have customer session flags with different names and attributes.

Figure 29:
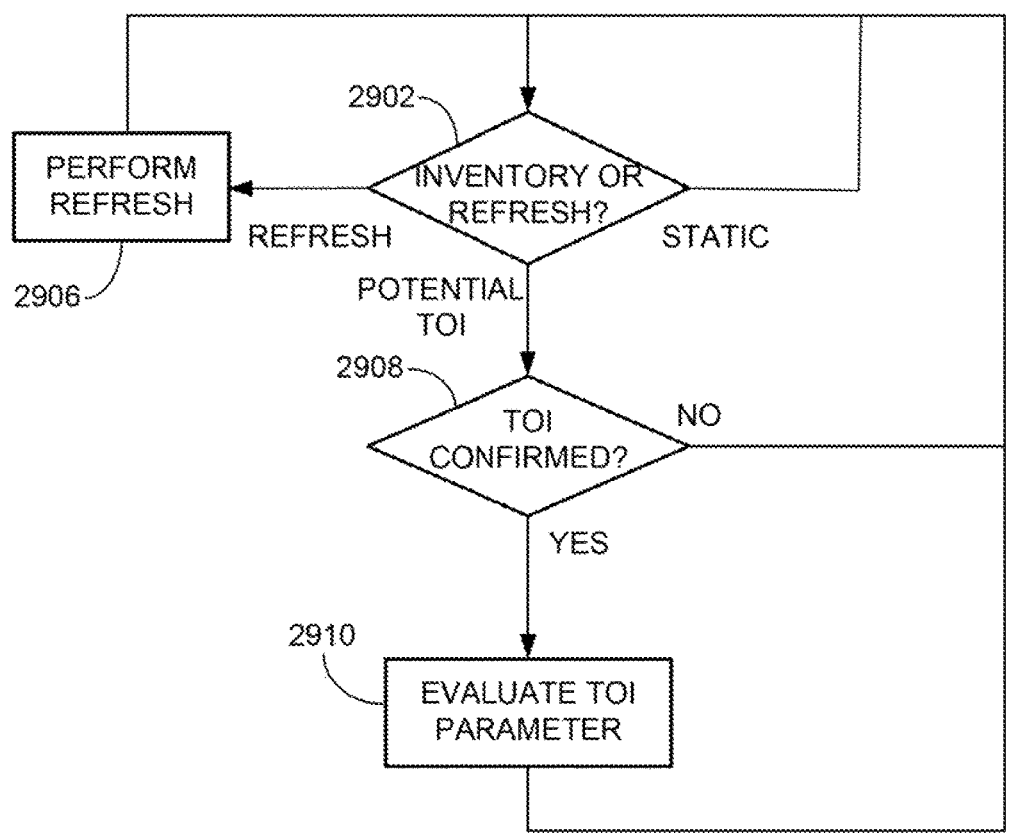
FIG. 29 is a flowchart of a tag tracking process according to embodiments.

FIG. 29 is a flowchart of a tag tracking process 2900, as may be performed by an SBR such as SBR 2702, according to embodiments.

In step 2902 the SBR determines whether to inventory tags or transmit a flag refresh command. The SBR may determine whether to transmit a refresh command based on whether it has recently inventoried any TOIs, the time since the last refresh command, the number of static tags, or any other suitable condition or combination of conditions.

If the SBR chooses to send a refresh command then it transmits a refresh command in step 2906, as described above in relation to step 2706 in FIG. 27. If the SBR chooses to inventory tags then it may receive an identifier from a static tag or a TO. The SBR may determine whether a tag is static or a TOI based on any of the above-described criteria, such as whether the SBR has observed the tag previously, whether the tag is moving, whether the tag has an identifier of interest, etc. The SBR may use multiple of its RF beams to inventory tags, and may use one or more sessions. Unless the SBR observes a TOI it returns to step 2902.

If the SBR finds a potential TOI then, in step 2908, it determines if the TOI was previously observed. If confirmed then the SBR may evaluate a TO parameter (e.g., whether the TOI is moving, which direction it came from/is going, speed, path, etc.) in step 2910. If the TOI is not confirmed then the SBR returns to step 2902 without evaluating a TOI parameter. Subsequently, the reader returns to step 2902.

In some embodiments, the SBR prioritizes the order in which it performs the tasks in step 2902 either in a fixed sequence or dynamically, based on information received from tags or from external sources.

Whereas the above tag-tracking process uses session S1, which decays over time, in other embodiments the process may use a different session that does not decay while the tag is energized, such as S3. In these embodiments refresh step 2906 may be omitted.

The steps described in processes 1800, 2300, and 2900 are for illustration purposes only. RFID tag management using SBRs may be performed employing additional or fewer steps and in different orders using the principles described herein. Of course the order of the steps may be modified, some steps eliminated, or other steps added according to other embodiments.

Whereas in the above description the RF beams for transmitting and receiving are synthesized by an SBR, in some embodiments one or more of the beams, in either or both of the transmit and receive functionalities, may be generated without the use of a synthesized-beam antenna. For example, the transmit beams may be generated by a synthesized-beam antenna but the receive beam may employ a static antenna such a a patch, monopole, dipole, etc. As another example, the synthesized beams may be replaced by multiple static antennas coupled to one or more readers.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for inventorying a Radio Frequency Identification (RFID) tag comprising:
    communicating, from a controller, a target location to a first synthesized-beam RFID reader and to a second synthesized-beam RFID reader;
    steering, responsive to the communicated target location, a first beam from the first synthesized-beam reader to the target location and a second beam from the second synthesized-beam reader to the target location;
    transmitting synchronized inventory commands from the first and second synthesized-beam readers;
    receiving, responsive to the synchronized inventory commands, a tag reply at at least one of the first and second synthesized-beam readers; and
    transmitting, from at least one of the first and second synthesized-beam readers, an acknowledgment signal responsive to the tag reply.

2. The method of claim 1, further comprising transmitting the acknowledgement signal from the first and second synthesized-beam readers.

3. The method of claim 1, wherein the target location includes at least one of:
a beam indicator;
a floor location;
a Cartesian coordinate; and
a polar coordinate.

4. The method of claim 1, further comprising adjusting at least one of a power and a frequency of at least one of the synchronized inventory commands.

5. The method of claim 4, wherein the adjusting comprises sweeping over a range of values.

6. The method of claim 1, further comprising steering the second beam to a plurality of locations in a vicinity of the target location.

7. The method of claim 1, further comprising synthesizing the second beam in response to at least one of:
determining that the first beam is an outer beam; and
determining that the tag is moving toward a periphery of a field-of-view of the first synthesized-beam reader.

8. A method for inventorying a Radio Frequency Identification (RFID) tag comprising:
communicating, from a first synthesized-beam RFID reader, a target location to a second synthesized-beam RFID reader;
steering a first beam from the first synthesized-beam reader to the target location;
steering, responsive to the communicated target location, a second beam from the second synthesized-beam reader to the target location;
transmitting synchronized inventory commands from the first and second synthesized-beam readers;
receiving, responsive to the synchronized inventory commands, a tag reply at at least one of the first and second synthesized-beam readers; and
transmitting, from at least one of the first and second synthesized-beam readers, an acknowledgment signal responsive to the tag reply.

9. The method of claim 8, further comprising transmitting the acknowledgement signal from the first and second synthesized-beam readers.

10. The method of claim 8, wherein the target location includes at least one of:
a beam indicator;
a floor location;
a Cartesian coordinate; and
a polar coordinate.

11. The method of claim 8, further comprising adjusting at least one of a power and a frequency of at least one of the synchronized inventory commands.

12. The method of claim 11, wherein the adjusting comprises sweeping over a range of values.

13. The method of claim 8, further comprising steering the second beam to a plurality of locations in a vicinity of the target location.

14. The method of claim 8, further comprising synthesizing the second beam in response to at least one of:
determining that the first beam is an outer beam; and
determining that the tag is moving toward a periphery of a field-of-view of the first synthesized-beam reader.

15. A method for inventorying a Radio Frequency Identification (RFID) tag comprising:
storing at least one target location and at least one corresponding target-location time in first and second synthesized-beam RFID readers;
steering, at the target-location time, a first beam from the first synthesized-beam reader to the target location and a second beam from the second synthesized-beam reader to the target location;
transmitting synchronized inventory commands from the first and second synthesized-beam readers;
receiving, responsive to the synchronized inventory commands, a tag reply at at least one of the first and second synthesized-beam readers; and
transmitting, from at least one of the first and second synthesized-beam readers, an acknowledgment signal responsive to the tag reply.

16. The method of claim 15, further comprising transmitting the acknowledgement signal from the first and second synthesized-beam readers.

17. The method of claim 15, wherein the target location includes at least one of:
a beam indicator;
a floor location;
a Cartesian coordinate; and
a polar coordinate.

18. The method of claim 15, further comprising adjusting at least one of a power and a frequency of at least one of the synchronized inventory commands.

19. The method of claim 18, wherein the adjusting comprises at least one of:
sweeping over a range of values; and
adaptive adjustment based on one or more of an environmental condition, a received tag reply, a tag performance characteristic, and a tag population size.

20. The method of claim 15, further comprising coordinating the target-location time between the first and second synthesized-beam readers by at least one of:
a timer;
a trigger signal; and
a communication from one of the first and second synthesized-beam readers to the other of the first and second synthesized-beam readers.

21. The method of claim 15, further comprising steering the second beam to a plurality of locations in a vicinity of the target location at the target-location time.

* * * * *

UNITED STATES PATENT AND TRADEMARK OFFICE
CERTIFICATE OF CORRECTION

| | | |
|---|---|---|
| PATENT NO. | : 9,652,643 B1 | Page 1 of 1 |
| APPLICATION NO. | : 15/075214 | |
| DATED | : May 16, 2017 | |
| INVENTOR(S) | : Alberto Pesavento et al. | |

It is certified that error appears in the above-identified patent and that said Letters Patent is hereby corrected as shown below:

In Column 1, Line 28, Delete "principle." and insert -- principle, --, therefor.
In Column 5, Line 21, After "signals)" insert -- . --.
In Column 10, Line 42, Delete "computer," and insert -- computer; --, therefor.
In Column 11, Line 43, After "657" insert -- . --.
In Column 15, Line 58, Delete "FIG. 1" and insert -- FIG. 11 --, therefor.
In Column 16, Line 9 (Approx.), Delete "120" and insert -- 1120 --, therefor.
In Column 17, Line 54, Delete "an," and insert -- art, --, therefor.
In Column 21, Line 37, Delete "cellular." and insert -- cellular, --, therefor.
In Column 23, Line 41, Delete "live" and insert -- five --, therefor.
In Column 26, Line 9, Delete "TOT" and insert -- TOI --, therefor.
In Column 26, Line 32, Delete "TO." and insert -- TOI. --, therefor.
In Column 26, Line 41, Delete "TO" and insert -- TOI --, therefor.
In Column 27, Line 2, Delete "a a" and insert -- as a --, therefor.
In Column 27, Line 23, Delete "and or" and insert -- and/or --, therefor.
In Column 28, Line 55, In Claim 1, delete "reader," and insert -- reader; --, therefor.

Signed and Sealed this
Twenty-sixth Day of June, 2018

Andrei Iancu
*Director of the United States Patent and Trademark Office*